(12) United States Patent
Becker

(10) Patent No.: US 9,563,733 B2
(45) Date of Patent: Feb. 7, 2017

(54) CELL CIRCUIT AND LAYOUT WITH LINEAR FINFET STRUCTURES

(75) Inventor: Scott T. Becker, Scotts Valley, CA (US)

(73) Assignee: Tela Innovations, Inc., Los Gatos, CA (US)

(*) Notice: Subject to any disclaimer, the term of this patent is extended or adjusted under 35 U.S.C. 154(b) by 339 days.

(21) Appl. No.: 12/775,429

(22) Filed: May 6, 2010

(65) Prior Publication Data

US 2010/0287518 A1 Nov. 11, 2010

Related U.S. Application Data

(60) Provisional application No. 61/176,058, filed on May 6, 2009.

(51) Int. Cl.
*G06F 17/50* (2006.01)
*H01L 29/76* (2006.01)
(Continued)

(52) U.S. Cl.
CPC ....... *G06F 17/5072* (2013.01); *H01L 27/0207* (2013.01); *H01L 27/088* (2013.01);
(Continued)

(58) Field of Classification Search
CPC ............ H01L 27/0688; H01L 2924/14; H01L 2223/54426; G06F 17/5077; G06F 17/5072; G06F 17/5068; G06F 17/5081
(Continued)

(56) References Cited

U.S. PATENT DOCUMENTS 4,069,493 A 1/1978 Bobenrieth
4,197,555 A 4/1980 Uehara et al.
(Continued)

FOREIGN PATENT DOCUMENTS

EP 0102644 7/1989
EP 0788166 8/1997
(Continued)

OTHER PUBLICATIONS

P. Mishra et al., FinFET Circuit Design, Nanoelectronic Circuit Design, pp. 23-54, 2011.*
(Continued)

*Primary Examiner* — Nghia Doan
(74) *Attorney, Agent, or Firm* — Martine Penilla Group, LLP

(57) ABSTRACT

A cell circuit and corresponding layout is disclosed to include linear-shaped diffusion fins defined to extend over a substrate in a first direction so as to extend parallel to each other. Each of the linear-shaped diffusion fins is defined to project upward from the substrate along their extent in the first direction. A number of gate level structures are defined to extend in a conformal manner over some of the number of linear-shaped diffusion fins. Portions of each gate level structure that extend over any of the linear-shaped diffusion fins extend in a second direction that is substantially perpendicular to the first direction. Portions of each gate level structure that extend over any of the linear-shaped diffusion fins form gate electrodes of a corresponding transistor. The diffusion fins and gate level structures can be placed in accordance with a diffusion fin virtual grate and a gate level virtual grate, respectively.

20 Claims, 7 Drawing Sheets

(51) Int. Cl.
*H01L 27/092* (2006.01)
*H01L 27/088* (2006.01)
*H01L 27/02* (2006.01)
*H01L 21/302* (2006.01)
*H01L 21/84* (2006.01)
*H01L 29/78* (2006.01)

(52) U.S. Cl.
CPC ........ *H01L 27/092* (2013.01); *H01L 27/0924* (2013.01); *G06F 17/5068* (2013.01); *G06F 2217/12* (2013.01); *H01L 21/302* (2013.01); *H01L 21/845* (2013.01); *H01L 29/785* (2013.01); *Y02P 90/265* (2015.11)

(58) Field of Classification Search
USPC .......................... 716/118–119, 126, 129–130
See application file for complete search history.

(56) References Cited

U.S. PATENT DOCUMENTS

| | | | |
|---|---|---|---|
| 4,417,161 | A | 11/1983 | Uya |
| 4,424,460 | A | 1/1984 | Best |
| 4,602,270 | A | 7/1986 | Finegold |
| 4,613,940 | A | 9/1986 | Shenton et al. |
| 4,657,628 | A | 4/1987 | Holloway et al. |
| 4,682,202 | A | 7/1987 | Tanizawa |
| 4,745,084 | A | 5/1988 | Rowson et al. |
| 4,780,753 | A | 10/1988 | Ohkura et al. |
| 4,801,986 | A | 1/1989 | Chang et al. |
| 4,804,636 | A | 2/1989 | Groover, III |
| 4,812,688 | A | 3/1989 | Chu et al. |
| 4,884,115 | A | 11/1989 | Michel et al. |
| 4,928,160 | A | 5/1990 | Crafts |
| 4,975,756 | A | 12/1990 | Haken et al. |
| 5,047,979 | A | 9/1991 | Leung |
| 5,068,603 | A | 11/1991 | Mahoney |
| 5,079,614 | A | 1/1992 | Khatakhotan |
| 5,097,422 | A | 3/1992 | Corbin et al. |
| 5,117,277 | A | 5/1992 | Yuyama et al. |
| 5,121,186 | A | 6/1992 | Wong et al. |
| 5,208,765 | A | 5/1993 | Turnbull |
| 5,224,057 | A | 6/1993 | Igarashi |
| 5,242,770 | A | 9/1993 | Chen et al. |
| 5,268,319 | A | 12/1993 | Harari |
| 5,298,774 | A | 3/1994 | Ueda et al. |
| 5,313,426 | A | 5/1994 | Sakuma et al. |
| 5,338,963 | A | 8/1994 | Klaasen |
| 5,351,197 | A | 9/1994 | Upton et al. |
| 5,359,226 | A | 10/1994 | DeJong |
| 5,365,454 | A | 11/1994 | Nakagawa et al. |
| 5,367,187 | A | 11/1994 | Yuen |
| 5,378,649 | A | 1/1995 | Huang |
| 5,396,128 | A | 3/1995 | Dunning et al. |
| 5,420,447 | A | 5/1995 | Waggoner |
| 5,461,577 | A | 10/1995 | Shaw et al. |
| 5,471,403 | A | 11/1995 | Fujimaga |
| 5,497,334 | A | 3/1996 | Russell et al. |
| 5,497,337 | A | 3/1996 | Ponnapalli et al. |
| 5,526,307 | A | 6/1996 | Lin et al. |
| 5,536,955 | A | 7/1996 | Ali |
| 5,545,904 | A | 8/1996 | Orbach |
| 5,581,098 | A | 12/1996 | Chang |
| 5,581,202 | A | 12/1996 | Yano et al. |
| 5,612,893 | A | 3/1997 | Hao et al. |
| 5,636,002 | A | 6/1997 | Garofalo |
| 5,656,861 | A | 8/1997 | Godinho et al. |
| 5,682,323 | A | 10/1997 | Pasch et al. |
| 5,684,311 | A | 11/1997 | Shaw |
| 5,684,733 | A | 11/1997 | Wu et al. |
| 5,698,873 | A | 12/1997 | Colwell et al. |
| 5,705,301 | A | 1/1998 | Garza et al. |
| 5,723,883 | A | 3/1998 | Gheewalla |
| 5,723,908 | A | 3/1998 | Fuchida et al. |
| 5,740,068 | A | 4/1998 | Liebmann et al. |
| 5,745,374 | A | 4/1998 | Matsumoto |
| 5,764,533 | A | 6/1998 | deDood |
| 5,774,367 | A | 6/1998 | Reyes et al. |
| 5,780,909 | A | 7/1998 | Hayashi |
| 5,789,776 | A | 8/1998 | Lancaster et al. |
| 5,790,417 | A | 8/1998 | Chao et al. |
| 5,796,128 | A | 8/1998 | Tran et al. |
| 5,796,624 | A | 8/1998 | Sridhar et al. |
| 5,798,298 | A | 8/1998 | Yang et al. |
| 5,814,844 | A | 9/1998 | Nagata et al. |
| 5,825,203 | A | 10/1998 | Kusunoki et al. |
| 5,834,851 | A | 11/1998 | Ikeda et al. |
| 5,838,594 | A | 11/1998 | Kojima |
| 5,841,663 | A | 11/1998 | Sharma et al. |
| 5,847,421 | A | 12/1998 | Yamaguchi |
| 5,850,362 | A | 12/1998 | Sakuma et al. |
| 5,852,562 | A | 12/1998 | Shinomiya et al. |
| 5,858,580 | A | 1/1999 | Wang et al. |
| 5,898,194 | A | 4/1999 | Gheewala |
| 5,900,340 | A | 5/1999 | Reich et al. |
| 5,905,287 | A | 5/1999 | Hirata |
| 5,908,827 | A | 6/1999 | Sirna |
| 5,915,199 | A | 6/1999 | Hsu |
| 5,917,207 | A | 6/1999 | Colwell et al. |
| 5,920,486 | A | 7/1999 | Beahm et al. |
| 5,923,059 | A | 7/1999 | Gheewala |
| 5,923,060 | A | 7/1999 | Gheewala |
| 5,929,469 | A | 7/1999 | Mimoto et al. |
| 5,930,163 | A | 7/1999 | Hara et al. |
| 5,935,763 | A | 8/1999 | Caterer et al. |
| 5,949,101 | A | 9/1999 | Aritome |
| 5,973,507 | A | 10/1999 | Yamazaki |
| 5,977,305 | A | 11/1999 | Wigler et al. |
| 5,977,574 | A | 11/1999 | Schmitt et al. |
| 5,998,879 | A | 12/1999 | Iwaki et al. |
| 6,009,251 | A | 12/1999 | Ho et al. |
| 6,026,223 | A | 2/2000 | Scepanovic et al. |
| 6,026,225 | A * | 2/2000 | Iwasaki ............... G06F 17/5068 716/112 |
| 6,037,613 | A | 3/2000 | Mariyama |
| 6,037,617 | A | 3/2000 | Kumagai |
| 6,044,007 | A | 3/2000 | Capodieci |
| 6,054,872 | A | 4/2000 | Fudanuki et al. |
| 6,063,132 | A | 5/2000 | DeCamp et al. |
| 6,077,310 | A | 6/2000 | Yamamoto et al. |
| 6,080,206 | A | 6/2000 | Tadokoro et al. |
| 6,084,255 | A | 7/2000 | Ueda |
| 6,084,437 | A | 7/2000 | Sako |
| 6,091,845 | A | 7/2000 | Pierrat et al. |
| 6,099,584 | A | 8/2000 | Arnold et al. |
| 6,100,025 | A | 8/2000 | Wigler et al. |
| 6,114,071 | A | 9/2000 | Chen et al. |
| 6,144,227 | A | 11/2000 | Sato |
| 6,159,839 | A | 12/2000 | Jeng et al. |
| 6,166,415 | A | 12/2000 | Sakemi et al. |
| 6,166,560 | A | 12/2000 | Ogura et al. |
| 6,174,742 | B1 | 1/2001 | Sudhindranath et al. |
| 6,182,272 | B1 | 1/2001 | Andreev et al. |
| 6,194,104 | B1 | 2/2001 | Hsu |
| 6,194,252 | B1 | 2/2001 | Yamaguchi |
| 6,194,912 | B1 | 2/2001 | Or-Bach |
| 6,209,123 | B1 | 3/2001 | Maziasz et al. |
| 6,230,299 | B1 | 5/2001 | McSherry et al. |
| 6,232,173 | B1 | 5/2001 | Hsu et al. |
| 6,240,542 | B1 | 5/2001 | Kapur |
| 6,249,902 | B1 | 6/2001 | Igusa et al. |
| 6,255,600 | B1 | 7/2001 | Schaper |
| 6,255,845 | B1 | 7/2001 | Wong et al. |
| 6,262,487 | B1 | 7/2001 | Igarashi et al. |
| 6,269,472 | B1 | 7/2001 | Garza et al. |
| 6,275,973 | B1 | 8/2001 | Wein |
| 6,282,696 | B1 | 8/2001 | Garza et al. |
| 6,291,276 | B1 | 9/2001 | Gonzalez |
| 6,297,668 | B1 | 10/2001 | Schober |
| 6,297,674 | B1 | 10/2001 | Kono et al. |
| 6,303,252 | B1 | 10/2001 | Lin |
| 6,331,733 | B1 | 12/2001 | Or-Bach et al. |
| 6,331,791 | B1 | 12/2001 | Huang |
| 6,335,250 | B1 | 1/2002 | Egi |

(56) References Cited

U.S. PATENT DOCUMENTS

| | | | |
|---|---|---|---|
| 6,338,972 | B1 | 1/2002 | Sudhindranath et al. |
| 6,347,062 | B2 | 2/2002 | Nii et al. |
| 6,356,112 | B1 | 3/2002 | Tran et al. |
| 6,359,804 | B2 | 3/2002 | Kuriyama et al. |
| 6,370,679 | B1 | 4/2002 | Chang et al. |
| 6,378,110 | B1 | 4/2002 | Ho |
| 6,380,592 | B2 | 4/2002 | Tooher et al. |
| 6,388,296 | B1 | 5/2002 | Hsu |
| 6,393,601 | B1 | 5/2002 | Tanaka et al. |
| 6,399,972 | B1 | 6/2002 | Masuda et al. |
| 6,400,183 | B2 | 6/2002 | Yamashita et al. |
| 6,408,427 | B1 | 6/2002 | Cong et al. |
| 6,415,421 | B2 | 7/2002 | Anderson et al. |
| 6,416,907 | B1 | 7/2002 | Winder et al. |
| 6,417,549 | B1 | 7/2002 | Oh |
| 6,421,820 | B1 | 7/2002 | Mansfield et al. |
| 6,425,112 | B1 | 7/2002 | Bula et al. |
| 6,425,117 | B1 | 7/2002 | Pasch et al. |
| 6,426,269 | B1 | 7/2002 | Haffner et al. |
| 6,436,805 | B1 | 8/2002 | Trivedi |
| 6,445,049 | B1 | 9/2002 | Iranmanesh |
| 6,445,065 | B1 | 9/2002 | Gheewala et al. |
| 6,467,072 | B1 | 10/2002 | Yang et al. |
| 6,469,328 | B2 | 10/2002 | Yanai et al. |
| 6,470,489 | B1 | 10/2002 | Chang et al. |
| 6,476,493 | B2 | 11/2002 | Or-Bach et al. |
| 6,477,695 | B1 | 11/2002 | Gandhi |
| 6,480,032 | B1 | 11/2002 | Aksamit |
| 6,480,989 | B2 | 11/2002 | Chan et al. |
| 6,492,066 | B1 | 12/2002 | Capodieci et al. |
| 6,496,965 | B1 | 12/2002 | van Ginneken et al. |
| 6,504,186 | B2 | 1/2003 | Kanamoto et al. |
| 6,505,327 | B2 | 1/2003 | Lin |
| 6,505,328 | B1 | 1/2003 | van Ginneken et al. |
| 6,507,941 | B1 | 1/2003 | Leung et al. |
| 6,509,952 | B1 | 1/2003 | Govil et al. |
| 6,514,849 | B1 | 2/2003 | Hui et al. |
| 6,516,459 | B1 | 2/2003 | Sahouria |
| 6,523,156 | B2 | 2/2003 | Cirit |
| 6,525,350 | B1 | 2/2003 | Kinoshita et al. |
| 6,536,028 | B1 | 3/2003 | Katsioulas et al. |
| 6,543,039 | B1 | 4/2003 | Watanabe |
| 6,553,544 | B2 | 4/2003 | Tanaka et al. |
| 6,553,559 | B2 | 4/2003 | Liebmann et al. |
| 6,553,562 | B2 | 4/2003 | Capodieci et al. |
| 6,566,720 | B2 | 5/2003 | Aldrich |
| 6,570,234 | B1 | 5/2003 | Gardner |
| 6,571,140 | B1 | 5/2003 | Wewalaarachchi |
| 6,571,379 | B2 | 5/2003 | Takayama |
| 6,574,786 | B1 | 6/2003 | Pohlenz et al. |
| 6,578,190 | B2 | 6/2003 | Ferguson et al. |
| 6,583,041 | B1 | 6/2003 | Capodieci |
| 6,588,005 | B1 | 7/2003 | Kobayashi et al. |
| 6,590,289 | B2 | 7/2003 | Shively |
| 6,591,207 | B2 | 7/2003 | Naya et al. |
| 6,609,235 | B2 | 8/2003 | Ramaswamy et al. |
| 6,610,607 | B1 | 8/2003 | Armbrust et al. |
| 6,617,621 | B1 | 9/2003 | Gheewala et al. |
| 6,620,561 | B2 | 9/2003 | Winder et al. |
| 6,621,132 | B2 | 9/2003 | Onishi et al. |
| 6,632,741 | B1 | 10/2003 | Clevenger et al. |
| 6,633,182 | B2 | 10/2003 | Pileggi et al. |
| 6,635,935 | B2 | 10/2003 | Makino |
| 6,642,744 | B2 | 11/2003 | Or-Bach et al. |
| 6,643,831 | B2 | 11/2003 | Chang et al. |
| 6,650,014 | B2 | 11/2003 | Kariyazaki |
| 6,661,041 | B2 | 12/2003 | Keeth |
| 6,662,350 | B2 * | 12/2003 | Fried et al. ................ 716/122 |
| 6,664,587 | B2 | 12/2003 | Guterman et al. |
| 6,673,638 | B1 | 1/2004 | Bendik et al. |
| 6,677,649 | B2 | 1/2004 | Minami et al. |
| 6,687,895 | B2 | 2/2004 | Zhang |
| 6,690,206 | B2 | 2/2004 | Rikino et al. |
| 6,691,297 | B1 | 2/2004 | Misaka et al. |
| 6,700,405 | B1 | 3/2004 | Hirairi |
| 6,703,170 | B1 | 3/2004 | Pindo |
| 6,709,880 | B2 | 3/2004 | Yamamoto et al. |
| 6,714,903 | B1 | 3/2004 | Chu et al. |
| 6,732,334 | B2 | 5/2004 | Nakatsuka |
| 6,732,338 | B2 | 5/2004 | Crouse et al. |
| 6,732,344 | B2 | 5/2004 | Sakamoto et al. |
| 6,734,506 | B2 | 5/2004 | Oyamatsu |
| 6,737,199 | B1 | 5/2004 | Hsieh |
| 6,737,318 | B2 | 5/2004 | Murata et al. |
| 6,737,347 | B1 | 5/2004 | Houston et al. |
| 6,745,372 | B2 | 6/2004 | Cote et al. |
| 6,745,380 | B2 | 6/2004 | Bodendorf et al. |
| 6,749,972 | B2 | 6/2004 | Yu |
| 6,750,555 | B2 | 6/2004 | Satomi et al. |
| 6,760,269 | B2 | 7/2004 | Nakase et al. |
| 6,765,245 | B2 | 7/2004 | Bansal |
| 6,777,138 | B2 | 8/2004 | Pierrat et al. |
| 6,777,146 | B1 | 8/2004 | Samuels |
| 6,787,823 | B2 | 9/2004 | Shibutani |
| 6,789,244 | B1 | 9/2004 | Dasasathyan et al. |
| 6,789,246 | B1 | 9/2004 | Mohan et al. |
| 6,792,591 | B2 | 9/2004 | Shi et al. |
| 6,792,593 | B2 | 9/2004 | Takashima et al. |
| 6,794,677 | B2 | 9/2004 | Tamaki et al. |
| 6,794,914 | B2 | 9/2004 | Sani et al. |
| 6,795,332 | B2 | 9/2004 | Yamaoka et al. |
| 6,795,358 | B2 | 9/2004 | Tanaka et al. |
| 6,795,952 | B1 | 9/2004 | Stine et al. |
| 6,795,953 | B2 | 9/2004 | Bakarian et al. |
| 6,800,883 | B2 | 10/2004 | Furuya et al. |
| 6,806,180 | B2 | 10/2004 | Cho |
| 6,807,663 | B2 | 10/2004 | Cote et al. |
| 6,809,399 | B2 | 10/2004 | Ikeda et al. |
| 6,812,574 | B2 | 11/2004 | Tomita et al. |
| 6,818,389 | B2 | 11/2004 | Fritze et al. |
| 6,818,929 | B2 | 11/2004 | Tsutsumi et al. |
| 6,819,136 | B2 | 11/2004 | Or-Bach |
| 6,820,248 | B1 | 11/2004 | Gan |
| 6,826,738 | B2 | 11/2004 | Cadouri |
| 6,834,375 | B1 | 12/2004 | Stine et al. |
| 6,841,880 | B2 | 1/2005 | Matsumoto et al. |
| 6,850,854 | B2 | 2/2005 | Naya et al. |
| 6,854,096 | B2 | 2/2005 | Eaton et al. |
| 6,854,100 | B1 | 2/2005 | Chuang et al. |
| 6,867,073 | B1 | 3/2005 | Enquist |
| 6,871,338 | B2 | 3/2005 | Yamauchi |
| 6,872,990 | B1 | 3/2005 | Kang |
| 6,877,144 | B1 | 4/2005 | Rittman et al. |
| 6,881,523 | B2 | 4/2005 | Smith |
| 6,884,712 | B2 | 4/2005 | Yelehanka et al. |
| 6,885,045 | B2 | 4/2005 | Hidaka |
| 6,889,370 | B1 | 5/2005 | Kerzman et al. |
| 6,897,517 | B2 | 5/2005 | Houdt et al. |
| 6,897,536 | B2 | 5/2005 | Nomura et al. |
| 6,898,770 | B2 | 5/2005 | Boluki et al. |
| 6,904,582 | B1 | 6/2005 | Rittman et al. |
| 6,918,104 | B2 | 7/2005 | Pierrat et al. |
| 6,920,079 | B2 | 7/2005 | Shibayama |
| 6,921,982 | B2 | 7/2005 | Joshi et al. |
| 6,922,354 | B2 | 7/2005 | Ishikura et al. |
| 6,924,560 | B2 | 8/2005 | Wang et al. |
| 6,928,635 | B2 | 8/2005 | Pramanik et al. |
| 6,931,617 | B2 | 8/2005 | Sanie et al. |
| 6,953,956 | B2 | 10/2005 | Or-Bach et al. |
| 6,954,918 | B2 | 10/2005 | Houston |
| 6,957,402 | B2 | 10/2005 | Templeton et al. |
| 6,968,527 | B2 | 11/2005 | Pierrat |
| 6,974,978 | B1 | 12/2005 | Possley |
| 6,977,856 | B2 | 12/2005 | Tanaka et al. |
| 6,978,436 | B2 | 12/2005 | Cote et al. |
| 6,978,437 | B1 | 12/2005 | Rittman et al. |
| 6,980,211 | B2 | 12/2005 | Lin et al. |
| 6,992,394 | B2 | 1/2006 | Park |
| 6,992,925 | B2 | 1/2006 | Peng |
| 6,993,741 | B2 | 1/2006 | Liebmann et al. |
| 6,994,939 | B1 | 2/2006 | Ghandehari et al. |
| 6,998,722 | B2 | 2/2006 | Madurawe |
| 7,003,068 | B2 | 2/2006 | Kushner et al. |
| 7,009,862 | B2 | 3/2006 | Higeta et al. |

(56) References Cited

U.S. PATENT DOCUMENTS

| | | | |
|---|---|---|---|
| 7,016,214 B2 | 3/2006 | Kawamata et al. |
| 7,022,559 B2 | 4/2006 | Barnak et al. |
| 7,028,285 B2 | 4/2006 | Cote et al. |
| 7,041,568 B2 | 5/2006 | Goldbach et al. |
| 7,052,972 B2 | 5/2006 | Sandhu et al. |
| 7,053,424 B2 | 5/2006 | Ono |
| 7,063,920 B2 | 6/2006 | Baba-Ali |
| 7,064,068 B2 | 6/2006 | Chou et al. |
| 7,065,731 B2 | 6/2006 | Jacques et al. |
| 7,079,413 B2 | 7/2006 | Tsukamoto et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 * | 10/2006 | Bernstein et al. ............ 257/204 |
| 7,120,882 B2 | 10/2006 | Kotani et al. |
| 7,124,386 B2 | 10/2006 | Smith et al. |
| 7,126,837 B1 | 10/2006 | Banachowicz et al. |
| 7,132,203 B2 | 11/2006 | Pierrat |
| 7,137,092 B2 | 11/2006 | Maeda |
| 7,141,853 B2 | 11/2006 | Campbell et al. |
| 7,143,380 B1 | 11/2006 | Anderson et al. |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat et al. |
| 7,159,197 B2 | 1/2007 | Falbo et al. |
| 7,174,520 B2 | 2/2007 | White et al. |
| 7,175,940 B2 | 2/2007 | Laidig et al. |
| 7,176,508 B2 | 2/2007 | Joshi et al. |
| 7,177,215 B2 | 2/2007 | Tanaka et al. |
| 7,183,611 B2 | 2/2007 | Bhattacharyya |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 * | 4/2007 | Dixit et al. ............... 257/287 |
| 7,205,191 B2 | 4/2007 | Kobayashi |
| 7,208,794 B2 | 4/2007 | Hofmann et al. |
| 7,214,579 B2 | 5/2007 | Widdershoven et al. |
| 7,219,326 B2 | 5/2007 | Reed et al. |
| 7,221,031 B2 | 5/2007 | Ryoo et al. |
| 7,225,423 B2 | 5/2007 | Bhattacharya et al. |
| 7,227,183 B2 | 6/2007 | Donze et al. |
| 7,228,510 B2 | 6/2007 | Ono |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,257,017 B2 | 8/2007 | Liaw |
| 7,264,990 B2 | 9/2007 | Rueckes et al. |
| 7,266,787 B2 | 9/2007 | Hughes et al. |
| 7,269,803 B2 | 9/2007 | Khakzadi et al. |
| 7,278,118 B2 | 10/2007 | Pileggi et al. |
| 7,279,727 B2 | 10/2007 | Ikoma et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,312,003 B2 | 12/2007 | Cote et al. |
| 7,315,994 B2 | 1/2008 | Aller et al. |
| 7,327,591 B2 | 2/2008 | Sadra et al. |
| 7,329,938 B2 | 2/2008 | Kinoshita |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,358,131 B2 | 4/2008 | Bhattacharyya |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 * | 8/2008 | Anderson et al. ............ 257/365 |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,424,696 B2 | 9/2008 | Vogel et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,492,013 B2 | 2/2009 | Correale, Jr. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,508,238 B2 | 3/2009 | Yamagami |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,355 B2 | 4/2009 | Katase |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Lee et al. |
| 7,568,174 B2 | 7/2009 | Sezginer et al. |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,625,790 B2 | 12/2009 | Yang |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |
| 7,700,466 B2 | 4/2010 | Booth et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,791,109 B2 | 9/2010 | Wann et al. |
| 7,802,219 B2 | 9/2010 | Tomar et al. |
| 7,825,437 B2 * | 11/2010 | Pillarisetty et al. .......... 257/204 |
| 7,842,975 B2 | 11/2010 | Becker et al. |
| 7,873,929 B2 | 1/2011 | Kahng et al. |
| 7,882,456 B2 | 2/2011 | Zach |

(56) References Cited

U.S. PATENT DOCUMENTS

| | | | |
|---|---|---|---|
| 7,888,705 B2 | 2/2011 | Becker et al. | |
| 7,898,040 B2 * | 3/2011 | Nawaz | 257/401 |
| 7,906,801 B2 | 3/2011 | Becker et al. | |
| 7,908,578 B2 | 3/2011 | Becker et al. | |
| 7,910,958 B2 | 3/2011 | Becker et al. | |
| 7,910,959 B2 | 3/2011 | Becker et al. | |
| 7,917,877 B2 | 3/2011 | Singh et al. | |
| 7,917,879 B2 | 3/2011 | Becker et al. | |
| 7,923,266 B2 * | 4/2011 | Thijs et al. | 438/14 |
| 7,923,337 B2 * | 4/2011 | Chang et al. | 438/303 |
| 7,923,757 B2 | 4/2011 | Becker et al. | |
| 7,926,001 B2 | 4/2011 | Pierrat | |
| 7,932,544 B2 | 4/2011 | Becker et al. | |
| 7,932,545 B2 | 4/2011 | Becker et al. | |
| 7,934,184 B2 | 4/2011 | Zhang | |
| 7,939,443 B2 | 5/2011 | Fox et al. | |
| 7,943,966 B2 | 5/2011 | Becker et al. | |
| 7,943,967 B2 | 5/2011 | Becker et al. | |
| 7,948,012 B2 | 5/2011 | Becker et al. | |
| 7,948,013 B2 | 5/2011 | Becker et al. | |
| 7,952,119 B2 | 5/2011 | Becker et al. | |
| 7,956,421 B2 | 6/2011 | Becker | |
| 7,958,465 B2 | 6/2011 | Lu et al. | |
| 7,962,867 B2 | 6/2011 | White et al. | |
| 7,962,879 B2 | 6/2011 | Tang et al. | |
| 7,964,267 B1 | 6/2011 | Lyons et al. | |
| 7,971,160 B2 | 6/2011 | Osawa et al. | |
| 7,989,847 B2 | 8/2011 | Becker et al. | |
| 7,989,848 B2 | 8/2011 | Becker et al. | |
| 7,992,122 B1 | 8/2011 | Burstein et al. | |
| 7,994,583 B2 * | 8/2011 | Inaba | 257/369 |
| 8,004,042 B2 * | 8/2011 | Yang et al. | 257/368 |
| 8,022,441 B2 | 9/2011 | Becker et al. | |
| 8,030,689 B2 | 10/2011 | Becker et al. | |
| 8,035,133 B2 | 10/2011 | Becker et al. | |
| 8,044,437 B1 | 10/2011 | Venkatraman et al. | |
| 8,058,671 B2 | 11/2011 | Becker et al. | |
| 8,058,690 B2 | 11/2011 | Chang | |
| 8,072,003 B2 | 12/2011 | Becker et al. | |
| 8,072,053 B2 | 12/2011 | Li | |
| 8,088,679 B2 | 1/2012 | Becker et al. | |
| 8,088,680 B2 | 1/2012 | Becker et al. | |
| 8,088,681 B2 | 1/2012 | Becker et al. | |
| 8,088,682 B2 | 1/2012 | Becker et al. | |
| 8,089,098 B2 | 1/2012 | Becker et al. | |
| 8,089,099 B2 | 1/2012 | Becker et al. | |
| 8,089,100 B2 | 1/2012 | Becker et al. | |
| 8,089,101 B2 | 1/2012 | Becker et al. | |
| 8,089,102 B2 | 1/2012 | Becker et al. | |
| 8,089,103 B2 | 1/2012 | Becker et al. | |
| 8,089,104 B2 | 1/2012 | Becker et al. | |
| 8,101,975 B2 | 1/2012 | Becker et al. | |
| 8,110,854 B2 | 2/2012 | Becker et al. | |
| 8,129,750 B2 | 3/2012 | Becker et al. | |
| 8,129,751 B2 | 3/2012 | Becker et al. | |
| 8,129,752 B2 | 3/2012 | Becker et al. | |
| 8,129,754 B2 | 3/2012 | Becker et al. | |
| 8,129,755 B2 | 3/2012 | Becker et al. | |
| 8,129,756 B2 | 3/2012 | Becker et al. | |
| 8,129,757 B2 | 3/2012 | Becker et al. | |
| 8,129,819 B2 | 3/2012 | Becker et al. | |
| 8,130,529 B2 | 3/2012 | Tanaka | |
| 8,134,183 B2 | 3/2012 | Becker et al. | |
| 8,134,184 B2 | 3/2012 | Becker et al. | |
| 8,134,185 B2 | 3/2012 | Becker et al. | |
| 8,134,186 B2 | 3/2012 | Becker et al. | |
| 8,138,525 B2 | 3/2012 | Becker et al. | |
| 8,161,427 B2 | 4/2012 | Morgenshtein et al. | |
| 8,178,905 B2 | 5/2012 | Toubou | |
| 8,178,909 B2 | 5/2012 | Venkatraman et al. | |
| 8,198,656 B2 | 6/2012 | Becker et al. | |
| 8,207,053 B2 | 6/2012 | Becker et al. | |
| 8,214,778 B2 | 7/2012 | Quandt et al. | |
| 8,217,428 B2 | 7/2012 | Becker et al. | |
| 8,225,239 B2 | 7/2012 | Reed et al. | |
| 8,225,261 B2 | 7/2012 | Hong et al. | |
| 8,245,180 B2 | 8/2012 | Smayling et al. | |
| 8,247,846 B2 | 8/2012 | Becker | |
| 8,253,172 B2 | 8/2012 | Becker et al. | |
| 8,253,173 B2 | 8/2012 | Becker et al. | |
| 8,258,547 B2 | 9/2012 | Becker et al. | |
| 8,258,548 B2 | 9/2012 | Becker et al. | |
| 8,258,549 B2 | 9/2012 | Becker et al. | |
| 8,258,550 B2 | 9/2012 | Becker et al. | |
| 8,258,551 B2 | 9/2012 | Becker et al. | |
| 8,258,552 B2 | 9/2012 | Becker et al. | |
| 8,258,581 B2 | 9/2012 | Becker et al. | |
| 8,264,007 B2 | 9/2012 | Becker et al. | |
| 8,264,008 B2 | 9/2012 | Becker et al. | |
| 8,264,009 B2 | 9/2012 | Becker et al. | |
| 8,283,701 B2 | 10/2012 | Becker et al. | |
| 8,294,212 B2 | 10/2012 | Wang et al. | |
| 8,316,327 B2 | 11/2012 | Herold | |
| 8,356,268 B2 | 1/2013 | Becker et al. | |
| 8,378,407 B2 | 2/2013 | Audzeyeu et al. | |
| 8,395,224 B2 | 3/2013 | Becker et al. | |
| 8,402,397 B2 | 3/2013 | Robles et al. | |
| 8,405,163 B2 | 3/2013 | Becker et al. | |
| 8,422,274 B2 | 4/2013 | Tomita et al. | |
| 8,436,400 B2 | 5/2013 | Becker et al. | |
| 8,453,094 B2 | 5/2013 | Kornachuk et al. | |
| 8,575,706 B2 | 11/2013 | Becker et al. | |
| 8,667,443 B2 | 3/2014 | Smayling et al. | |
| 8,701,071 B2 | 4/2014 | Kornachuk et al. | |
| 8,735,995 B2 | 5/2014 | Becker et al. | |
| 8,756,551 B2 | 6/2014 | Becker et al. | |
| 8,836,045 B2 | 9/2014 | Becker et al. | |
| 8,839,162 B2 | 9/2014 | Amundson et al. | |
| 8,839,175 B2 | 9/2014 | Smayling et al. | |
| 8,847,329 B2 | 9/2014 | Becker et al. | |
| 8,863,063 B2 | 10/2014 | Becker et al. | |
| 9,202,779 B2 | 12/2015 | Kornachuk et al. | |
| 9,336,344 B2 | 5/2016 | Smayling | |
| 2001/0049813 A1 | 12/2001 | Chan et al. | |
| 2002/0003270 A1 | 1/2002 | Makino | |
| 2002/0015899 A1 | 2/2002 | Chen et al. | |
| 2002/0030510 A1 | 3/2002 | Kono et al. | |
| 2002/0063582 A1 | 5/2002 | Rikino | |
| 2002/0068423 A1 | 6/2002 | Park et al. | |
| 2002/0079927 A1 | 6/2002 | Katoh et al. | |
| 2002/0149392 A1 | 10/2002 | Cho | |
| 2002/0166107 A1 | 11/2002 | Capodieci et al. | |
| 2002/0194575 A1 | 12/2002 | Allen et al. | |
| 2003/0042930 A1 | 3/2003 | Pileggi et al. | |
| 2003/0046653 A1 | 3/2003 | Liu | |
| 2003/0061592 A1 | 3/2003 | Agrawal et al. | |
| 2003/0088839 A1 | 5/2003 | Watanabe | |
| 2003/0088842 A1 | 5/2003 | Cirit | |
| 2003/0103176 A1 | 6/2003 | Abe et al. | |
| 2003/0106037 A1 | 6/2003 | Moniwa et al. | |
| 2003/0117168 A1 | 6/2003 | Uneme et al. | |
| 2003/0124847 A1 | 7/2003 | Houston et al. | |
| 2003/0125917 A1 | 7/2003 | Rich et al. | |
| 2003/0126569 A1 | 7/2003 | Rich et al. | |
| 2003/0145288 A1 | 7/2003 | Wang et al. | |
| 2003/0145299 A1 * | 7/2003 | Fried et al. | 716/11 |
| 2003/0177465 A1 | 9/2003 | MacLean et al. | |
| 2003/0185076 A1 | 10/2003 | Worley | |
| 2003/0203287 A1 | 10/2003 | Miyagawa | |
| 2003/0229868 A1 | 12/2003 | White et al. | |
| 2003/0229875 A1 | 12/2003 | Smith et al. | |
| 2004/0029372 A1 | 2/2004 | Jang et al. | |
| 2004/0049754 A1 | 3/2004 | Liao et al. | |
| 2004/0063038 A1 | 4/2004 | Shin et al. | |
| 2004/0115539 A1 | 6/2004 | Broeke et al. | |
| 2004/0139412 A1 | 7/2004 | Ito et al. | |
| 2004/0145028 A1 | 7/2004 | Matsumoto et al. | |
| 2004/0153979 A1 | 8/2004 | Chang | |
| 2004/0161878 A1 | 8/2004 | Or-Bach et al. | |
| 2004/0164360 A1 | 8/2004 | Nishida et al. | |
| 2004/0169201 A1 | 9/2004 | Hidaka | |
| 2004/0194050 A1 | 9/2004 | Hwang et al. | |
| 2004/0196705 A1 | 10/2004 | Ishikura et al. | |
| 2004/0229135 A1 | 11/2004 | Wang et al. | |

(56) References Cited

U.S. PATENT DOCUMENTS

| | | |
|---|---|---|
| 2004/0232444 A1 | 11/2004 | Shimizu |
| 2004/0243966 A1 | 12/2004 | Dellinger |
| 2004/0262640 A1 | 12/2004 | Suga |
| 2005/0009312 A1 | 1/2005 | Butt et al. |
| 2005/0009344 A1 | 1/2005 | Hwang et al. |
| 2005/0012157 A1 | 1/2005 | Cho et al. |
| 2005/0044522 A1 | 2/2005 | Maeda |
| 2005/0055828 A1 | 3/2005 | Wang et al. |
| 2005/0076320 A1 | 4/2005 | Maeda |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0110130 A1 | 5/2005 | Kitabayashi et al. |
| 2005/0135134 A1 | 6/2005 | Yen |
| 2005/0136340 A1 | 6/2005 | Baselmans et al. |
| 2005/0138598 A1 | 6/2005 | Kokubun |
| 2005/0156200 A1 | 7/2005 | Kinoshita |
| 2005/0185325 A1 | 8/2005 | Hur |
| 2005/0189604 A1 | 9/2005 | Gupta et al. |
| 2005/0189614 A1 | 9/2005 | Ihme et al. |
| 2005/0196685 A1 | 9/2005 | Wang et al. |
| 2005/0205894 A1 | 9/2005 | Sumikawa et al. |
| 2005/0212018 A1 | 9/2005 | Schoellkopf et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0264320 A1 | 12/2005 | Chan et al. |
| 2005/0264324 A1 | 12/2005 | Nakazato |
| 2005/0266621 A1 | 12/2005 | Kim |
| 2005/0268256 A1 | 12/2005 | Tsai et al. |
| 2005/0278673 A1 | 12/2005 | Kawachi |
| 2005/0280031 A1 | 12/2005 | Yano |
| 2006/0038234 A1 | 2/2006 | Liaw |
| 2006/0063334 A1* | 3/2006 | Donze et al. ............... 438/268 |
| 2006/0070018 A1 | 3/2006 | Semmler |
| 2006/0084261 A1 | 4/2006 | Iwaki |
| 2006/0091550 A1 | 5/2006 | Shimazaki et al. |
| 2006/0095872 A1 | 5/2006 | McElvain |
| 2006/0101370 A1 | 5/2006 | Cui et al. |
| 2006/0112355 A1 | 5/2006 | Pileggi et al. |
| 2006/0113533 A1 | 6/2006 | Tamaki et al. |
| 2006/0113567 A1 | 6/2006 | Ohmori et al. |
| 2006/0120143 A1 | 6/2006 | Liaw |
| 2006/0121715 A1 | 6/2006 | Chang et al. |
| 2006/0123376 A1 | 6/2006 | Vogel et al. |
| 2006/0125024 A1 | 6/2006 | Ishigaki |
| 2006/0131609 A1 | 6/2006 | Kinoshita et al. |
| 2006/0136848 A1 | 6/2006 | Ichiryu et al. |
| 2006/0146638 A1 | 7/2006 | Chang et al. |
| 2006/0151810 A1 | 7/2006 | Ohshige |
| 2006/0158270 A1 | 7/2006 | Gibet et al. |
| 2006/0177744 A1 | 8/2006 | Bodendorf et al. |
| 2006/0181310 A1 | 8/2006 | Rhee |
| 2006/0195809 A1 | 8/2006 | Cohn et al. |
| 2006/0195810 A1 | 8/2006 | Morton |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2006/0261417 A1 | 11/2006 | Suzuki |
| 2006/0277521 A1 | 12/2006 | Chen |
| 2007/0001304 A1 | 1/2007 | Liaw |
| 2007/0002617 A1 | 1/2007 | Houston |
| 2007/0004147 A1 | 1/2007 | Toubou |
| 2007/0007574 A1 | 1/2007 | Ohsawa |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0172770 A1 | 7/2007 | Witters et al. |
| 2007/0186196 A1 | 8/2007 | Tanaka |
| 2007/0196958 A1 | 8/2007 | Bhattacharya et al. |
| 2007/0209029 A1 | 9/2007 | Ivonin et al. |
| 2007/0210391 A1 | 9/2007 | Becker et al. |
| 2007/0234252 A1 | 10/2007 | Visweswariah et al. |
| 2007/0234262 A1 | 10/2007 | Uedi et al. |
| 2007/0241810 A1 | 10/2007 | Onda |
| 2007/0256039 A1 | 11/2007 | White |
| 2007/0257277 A1 | 11/2007 | Takeda et al. |
| 2007/0264758 A1 | 11/2007 | Correale |
| 2007/0274140 A1 | 11/2007 | Joshi et al. |
| 2007/0277129 A1 | 11/2007 | Allen et al. |
| 2007/0288882 A1 | 12/2007 | Kniffin et al. |
| 2007/0290361 A1 | 12/2007 | Chen |
| 2007/0294652 A1 | 12/2007 | Bowen |
| 2007/0297249 A1 | 12/2007 | Chang et al. |
| 2008/0001176 A1 | 1/2008 | Gopalakrishnan |
| 2008/0005712 A1 | 1/2008 | Charlebois et al. |
| 2008/0021689 A1 | 1/2008 | Yamashita et al. |
| 2008/0022247 A1 | 1/2008 | Kojima et al. |
| 2008/0046846 A1 | 2/2008 | Chew et al. |
| 2008/0081472 A1 | 4/2008 | Tanaka |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0098341 A1 | 4/2008 | Kobayashi et al. |
| 2008/0099795 A1* | 5/2008 | Bernstein et al. ............ 257/255 |
| 2008/0127000 A1 | 5/2008 | Majumder et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0251779 A1 | 10/2008 | Kakoschke et al. |
| 2008/0265290 A1 | 10/2008 | Nielsen et al. |
| 2008/0276105 A1 | 11/2008 | Hoberman et al. |
| 2008/0283910 A1* | 11/2008 | Dreeskornfeld et al. ..... 257/332 |
| 2008/0285331 A1 | 11/2008 | Torok et al. |
| 2008/0308848 A1* | 12/2008 | Inaba ........................... 257/255 |
| 2008/0308880 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1 | 2/2009 | Becker et al. |
| 2009/0057780 A1 | 3/2009 | Wong et al. |
| 2009/0075485 A1 | 3/2009 | Ban et al. |
| 2009/0077524 A1 | 3/2009 | Nagamura |
| 2009/0085067 A1 | 4/2009 | Hayashi et al. |
| 2009/0087991 A1 | 4/2009 | Yatsuda et al. |
| 2009/0101940 A1* | 4/2009 | Barrows et al. ............. 257/204 |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |
| 2009/0228857 A1 | 9/2009 | Kornachuk et al. |
| 2009/0235215 A1 | 9/2009 | Lavin |
| 2009/0273100 A1 | 11/2009 | Aton et al. |
| 2009/0280582 A1* | 11/2009 | Thijs et al. ..................... 438/14 |
| 2009/0302372 A1* | 12/2009 | Chang et al. ................. 257/327 |
| 2009/0319977 A1 | 12/2009 | Saxena et al. |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |

(56) References Cited

U.S. PATENT DOCUMENTS

| | | |
|---|---|---|
| 2010/0006950 A1 | 1/2010 | Becker et al. |
| 2010/0006951 A1 | 1/2010 | Becker et al. |
| 2010/0006986 A1 | 1/2010 | Becker et al. |
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1 | 2/2010 | Becker et al. |
| 2010/0096671 A1 | 4/2010 | Becker et al. |
| 2010/0115484 A1 | 5/2010 | Frederick |
| 2010/0203689 A1* | 8/2010 | Bernstein et al. ............ 438/198 |
| 2010/0224943 A1 | 9/2010 | Kawasaki |
| 2010/0229140 A1 | 9/2010 | Strolenberg et al. |
| 2010/0232212 A1* | 9/2010 | Anderson et al. ............ 365/149 |
| 2010/0252865 A1 | 10/2010 | Van Der Zanden |
| 2010/0252896 A1 | 10/2010 | Smayling |
| 2010/0264468 A1* | 10/2010 | Xu ............................... 257/288 |
| 2010/0270681 A1 | 10/2010 | Bird et al. |
| 2010/0287518 A1 | 11/2010 | Becker |
| 2010/0301482 A1 | 12/2010 | Schultz et al. |
| 2011/0016909 A1 | 1/2011 | Mirza et al. |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1* | 8/2011 | Anderson et al. ............ 438/478 |
| 2011/0260253 A1* | 10/2011 | Inaba ............................ 257/351 |
| 2011/0298025 A1 | 12/2011 | Haensch et al. |
| 2011/0317477 A1 | 12/2011 | Liaw |
| 2012/0012932 A1* | 1/2012 | Perng et al. .................. 257/347 |
| 2012/0118854 A1 | 5/2012 | Smayling |
| 2012/0131528 A1* | 5/2012 | Chen ................... G06F 17/5077 716/112 |
| 2012/0273841 A1 | 11/2012 | Quandt et al. |
| 2013/0097574 A1 | 4/2013 | Balabanov et al. |
| 2013/0200465 A1 | 8/2013 | Becker et al. |
| 2013/0200469 A1 | 8/2013 | Becker et al. |
| 2013/0207198 A1 | 8/2013 | Becker et al. |
| 2013/0207199 A1 | 8/2013 | Becker et al. |
| 2013/0254732 A1 | 9/2013 | Kornachuk et al. |
| 2014/0197543 A1 | 7/2014 | Kornachuk et al. |
| 2015/0249041 A1 | 9/2015 | Becker et al. |
| 2015/0270218 A1 | 9/2015 | Becker et al. |
| 2016/0079159 A1 | 3/2016 | Kornachuk et al. |

FOREIGN PATENT DOCUMENTS

| | | |
|---|---|---|
| EP | 1394858 | 3/2004 |
| EP | 1670062 | 6/2006 |
| EP | 1833091 | 8/2007 |
| EP | 1730777 | 9/2007 |
| EP | 2251901 | 11/2010 |
| FR | 2860920 | 4/2005 |
| JP | 58-182242 | 10/1983 |
| JP | 58-215827 | 12/1983 |
| JP | 61-182244 | 8/1986 |
| JP | S63-310136 A | 12/1988 |
| JP | H01284115 | 11/1989 |
| JP | 03-165061 | 7/1991 |
| JP | H05152937 A | 6/1993 |
| JP | H05211437 | 8/1993 |
| JP | H05218362 | 8/1993 |
| JP | H07-153927 A | 6/1995 |
| JP | 2684980 | 7/1995 |
| JP | 1995-302706 | 11/1995 |
| JP | 1997-09289251 A | 11/1997 |
| JP | 10-116911 | 5/1998 |
| JP | 1999-045948 | 2/1999 |
| JP | 2001-068558 | 3/2001 |
| JP | 2001-168707 | 6/2001 |
| JP | 2002-026125 | 1/2002 |
| JP | 2002-026296 A | 1/2002 |
| JP | 2002-184870 A | 6/2002 |
| JP | 2001-056463 | 9/2002 |
| JP | 2002-258463 | 9/2002 |
| JP | 2002-289703 | 10/2002 |
| JP | 2001-272228 | 3/2003 |
| JP | 2003-100872 | 4/2003 |
| JP | 2003-264231 | 9/2003 |
| JP | 2004-013920 | 1/2004 |
| JP | 2004-200300 | 7/2004 |
| JP | 2004-241529 | 8/2004 |
| JP | 2004-342757 A | 12/2004 |
| JP | 2005-020008 | 1/2005 |
| JP | 2003-359375 | 5/2005 |
| JP | 2005-135971 A | 5/2005 |
| JP | 2005-149265 | 6/2005 |
| JP | 2005-183793 | 7/2005 |
| JP | 2005-203447 | 7/2005 |
| JP | 2005-268610 | 9/2005 |
| JP | 2006-073696 | 3/2006 |
| JP | 2005-114752 | 10/2006 |
| JP | 2006-303022 A | 11/2006 |
| JP | 2007-012855 | 1/2007 |
| JP | 2007-013060 | 1/2007 |
| JP | 2007-043049 | 2/2007 |
| JP | 2007-141971 | 6/2007 |
| JP | 2011-515841 | 5/2011 |
| KR | 10-0417093 | 6/1997 |
| KR | 10-1998-087485 | 12/1998 |
| KR | 1998-0084215 A | 12/1998 |
| KR | 10-1999-0057943 A | 7/1999 |
| KR | 10-2000-0028830 A | 5/2000 |
| KR | 10-2002-0034313 | 5/2002 |
| KR | 10-2002-0070777 | 9/2002 |
| KR | 2003-0022006 | 3/2003 |
| KR | 2004-0005609 | 1/2004 |
| KR | 10-2005-0030347 A | 3/2005 |
| KR | 2005-0037965 A | 4/2005 |
| KR | 2006-0108233 A | 10/2006 |
| TW | 386288 | 4/2000 |
| TW | 200709309 | 3/2007 |
| TW | 200709565 | 3/2007 |
| TW | 200811704 A | 3/2008 |

(56) References Cited

FOREIGN PATENT DOCUMENTS

| TW | 200947567 A | 11/2009 |
|---|---|---|
| WO | WO 2005/104356 | 11/2005 |
| WO | WO 2006/014849 | 2/2006 |
| WO | WO 2006/052738 | 5/2006 |
| WO | WO 2006/090445 | 8/2006 |
| WO | WO 2007/014053 | 2/2007 |
| WO | WO 2007/103587 | 9/2007 |

OTHER PUBLICATIONS

D. D Pham et al., FinFET Device Junction Formation Challenges, @006 International Workshop on Junction Technology, pp. 73-77, Aug. 2006.*
Acar, et al., "A Linear-Centric Simulation Framework for Parametric Fluctuations", 2002, IEEE, Carnegie Mellon University USA, pp. 1-8.
Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476.
Axelrad et al. "Efficient Full-Chip Yield Analysis Methodology for OPC-Corrected VLSI Design", 2000, International Symposium on Quality Electronic Design (ISQED).
Balasinski et al. "Impact of Subwavelength CD Tolerance on Device Performance", 2002, SPIE.
Burkhardt, et al., "Dark Field Double Dipole Lithography (DDL) for Back-End-Of-Line Processes", 2007, SPIE Proceeding Series, vol. 6520; 65200K.
Capetti, et al., "Sub kl=0.25 Lithography with Double Patterning Technique for 45nm Technology Node Flash Memory Devices at $\lambda$=193nm", 2007, SPIE Proceeding Series, vol. 6520; 65202K.
U.S. Appl. No. 60/625,342, filed May 25, 2006, Pileggi et al.
Capodieci, L., et al., "Toward a Methodology for Manufacturability-Driven Design Rule Exploration," DAC 2004, Jun. 7-11, 2004, San Diego, CA.
Chandra, et al., "An Interconnect Channel Design Methodology for High Performance Integrated Circuits", 2004, IEEE, Carnegie Mellon University, pp. 1-6.
Cheng, et al., "Feasibility Study of Splitting Pitch Technology on 45nm Contact Patterning with 0.93 NA", 2007, SPIE Proceeding Series, vol. 6520; 65202N.
Chow, et al., "The Design of a SRAM-Based Field-Programmable Gate Array—Part II: Circuit Design and Layout", 1999, IEEE, vol. 7 # 3 pp. 321-330.
Clark et al. "Managing Standby and Active Mode Leakage Power in Deep Sub-Micron Design", Aug. 9-11, 2004, ACM.
Cobb et al. "Using OPC to Optimize for Image Slope and Improve Process Window", 2003, SPIE.
Devgan "Leakage Issues in IC Design: Part 3", 2003, CCAD.
DeVor, et al., "Statistical Quality Design and Control", 1992, Macmillan Publishing Company, pp. 264-267.
Dictionary.com, "channel," in Collins English Dictionary—Complete & Unabridged 10th Edition. Source location: HarperCollins Publishers. http://dictionary.reference.com/browse/channel. Available: http://dictionary.reference.com.
Dusa, et al. "Pitch Doubling Through Dual Patterning Lithography Challenges in Integration and Litho Budgets", 2007, SPIE Proceedings Series, vol. 6520; 65200G.
El-Gamal, "Fast, Cheap and Under Control: The Next Implementation Fabric", Jun. 2-6, 2003, ACM Press, pp. 354-355.
Frankel, "Quantum State Control Interference Lithography and Trim Double Patterning for 32-16nm Lithography", 2007, SPIE; Proceeding Series, vol. 6520; 65202L.
Garg, et al. " Lithography Driven Layout Design", 2005, IEEE.
Grobman et al. "Reticle Enhancement Technology Trends: Resource and Manufacturability Implications for the Implementation of Physical Designs" Apr. 1-4, 2001, ACM.
Grobman et al. "Reticle Enhancement Technology: Implications and Challenges for Physical Design" Jun. 18-22, 2001, ACM.
Gupta et al. "Enhanced Resist and Etch CD Control by Design Perturbation", Oct. 4-7, 2006, Society of Photo-Optical Instrumentation Engineers.
Gupta et al. "A Practical Transistor-Level Dual Threshold Voltage Assignment Methodology", 2005, Sixth International Symposium on Quality Electronic Design (ISQED).
Gupta et al. "Detailed Placement for Improved Depth of Focus and Cd Control", 2005, ACM.
Gupta et al. "Joining the Design and Mask Flows for Better and Cheaper Masks", Oct. 14-17, 2004, Society of Photo-Optical Instrumentation Engineers.
Gupta et al. "Manufacturing-Aware Physical Design", 2003, ACM.
Gupta et al. "Selective Gate-Length Biasing for Cost-Effective Runtime Leakage Control", Jun. 7-11, 2004, ACM.
Gupta et al. "Wafer Topography-Aware Optical Proximity Correction for Better DOF Margin and CD Control", Apr. 13-15, 2005, SPIE.
Gupta, Puneet, et al., "Manufacturing-aware Design Methodology for Assist Feature Correctness," 2005.
Ha et al., "Reduction in the Mask Error Factor by Optimizing the Diffraction Order of a Scattering Bar in Lithography," Journal of the Korean Physical Society, vol. 46, No. 5, May 2005, pp. 1213-1217.
Halpin et al., "Detailed Placement with Net Length Constraints," Publication Year 2003, Proceedings of the 3rd IEEE International Workshop on System-on-Chip for Real-Time Applications, pp. 22-27.
Hayashida, et al., "Manufacturable Local Interconnect technology Fully Compatible with Titanium Salicide Process", Jun. 11-12, 1991, VMIC Conference.
Heng, et al., "A VLSI Artwork Legalization Technique Base on a New Criterion of Minimum Layout Perturbation", 1997, ACM Press, pp. 116-121.
Heng, et al., "Toward Through-Process Layout Quality Metrics", Mar. 3-4, 2005, Society of Photo-Optical Instrumentation Engineers.
Hu, et al., "Synthesis and Placement Flow for Gain-Based Programmable Regular Fabrics", Apr. 6-9, 2003, ACM Press, pp. 197-203.
Hur et al., "Mongrel: Hybrid Techniques for Standard Cell Placement," Publication Year 2000, IEEE/ACM International Conference on Computer Aided Design, ICCAD-2000, pp. 165-170.
Hutton, et al., "A Methodology for FPGA to Structured-ASIC Synthesis and Verification", 2006, EDAA, pp. 64-69.
INTEL Core Microarchitecture White Paper "Introducing the 45 nm Next-Generation Intel Core Microarchitecture," 2007, Intel Corporation.
Jayakumar, et al., "A Metal and VIA Maskset Programmable VLSI Design Methodology using PLAs", 2004, IEEE, pp. 590-594.
Jhaveri, T. et al., Maximization of Layout Printability/Manufacturability by Extreme Layout Regularity, Proc. of the SPIE, Apr. 2006.
Kang, S.M., Metal-Metal Matrix (M3) for High-Speed MOS VLSI Layout, IEEE Trans. on CAD, vol. CAD-6, No. 5, Sep. 1987.
Kheterpal, et al., "Design Methodology for IC Manufacturability Based on Regular Logic-Bricks", DAC, Jun. 13-17, 2005, IEEE/AMC, vol. 6520.
Kheterpal, et al., "Routing Architecture Exploration for Regular Fabrics", DAC, Jun. 7-11, 2004, ACM Press, pp. 204-207.
Kim, et al., "Double Exposure Using 193nm Negative Tone Photoresist", 2007, SPIE Proceeding Series, vol. 6520; 65202M.
Kim, et al., "Issues and Challenges of Double Patterning Lithography in DRAM", 2007, SPIE Proceeding Series, vol. 6520; 65200H.
Koorapaty, et al., "Exploring Logic Block Granularity for Regular Fabrics", 2004, IEEE, pp. 1-6.
Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.
Koorapaty, et al., "Modular, Fabric-Specific Synthesis for Programmable Architectures", 12th International Conference on Field Pro-

(56) References Cited

OTHER PUBLICATIONS grammable Logic and Applications (FPL_2002, Lecture Notes in Computer Science (LNCS)), Sep. 2002, Springer-Verlag, vol. 2438 pp. 132-141.
Kuh et al., "Recent Advances in VLSI Layout," Publication Year 1990, Proceedings of the IEEE, vol. 78, Issue 2, pp. 237-263.
Lavin et al. "Backend DAC Flows for "Restrictive Design Rules"", 2004, IEEE.
Li, et al., "A Linear-Centric Modeling Approach to Harmonic Balance Analysis", 2002, IEEE, pp. 1-6.
Li, et al., "Nonlinear Distortion Analysis Via Linear-Centric Models", 2003, IEEE, pp. 897-903.
Liebmann et al., "Integrating DfM Components Into a Cohesive Design-To-Silicon Solution", IBM Systems and Technology Group, IBM Research, pp. 1-12.
Liebmann et al., "Optimizing Style Options for Sub-Resolution Assist Features," Proc. of SPIE vol. 4346, 2001, pp. 141-152.
Liebmann, L. W., Layout Impact of Resolution Enhancement Techniques: Impediment or Opportunity?, International Symposium on Physical Design, 2003.
Liebmann, et al., "High-Performance Circuit Design for the RET-Enabled 65nm Technology Node", Feb. 26-27, 2004, SPIE: Proceeding Series, vol. 5379 pp. 20-29.
Liu, et al., "Double Patterning with Multilayer Hard Mask Shrinkage for Sub-0.25 k1 Lithography", 200, SPIE Proceeding Series, vol. 6520; 65202J.
Mansfield et al., "Lithographic Comparison of Assist Feature Design Strategies," Proc. of SPIE, vol. 4000, 2000, pp. 63-76.
Miller, "Manufacturing-Aware Design Helps Boost IC Yield", Sep. 9, 2004, http://www.eetimes.com/showArticle.jhtml?articleID=47102054.
Mishra, P., et al., "FinFET Circuit Design," Nanoelectronic Circuit Design, pp. 23-54, 2011.
Mo, et al., "Checkerboard: A Regular Structure and its Synthesis, International Workshop on Logic and Synthesis", 2003, Department of Electrical Engineering and Computer Sciences, UC Berkeley, California, pp. 1-7.
Mo, et al., "PLA-Based Regular Structures and Their Synthesis", 2003, Department of Electrical Engineering and Computer Sciences, IEEE, pp. 723-729.
Mo, et al., "Regular Fabrics in Deep Sub-Micron Integrated-Circuit Design", 2004, Kluwer Academic Publishers, Entire Book.
Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.
Mutoh et al. "1-V Power Supply High-Speed Digital Circuit Technology with Multithreshold-Voltage CMOS", 1995, IEEE.
Op de Beek, et al., "Manufacturability issues with Double Patterning for 50nm half pitch damascene applications, using RELACS® shrink and corresponding OPC", 2007, SPIE Proceeding Series, vol. 6520; 652001.
Or-Bach, "Programmable Circuit Fabrics", Sep. 18, 2001, e-ASIC, pp. 1-36.
Otten, et al., "Planning for Performance", DAC 1998, ACM Inc., pp. 122-127.
Pack et al. "Physical & Timing Verification of Subwavelength-Scale Designs-Part I: Lithography Impact on MOSFETs", 2003, SPIE.
Pandini, et al., "Congestion-Aware Logic Synthesis", 2002, IEEE, pp. 1-8.
Pandini, et al., "Understanding and Addressing the Impact of Wiring Congestion During Technology Mapping", ISPD Apr. 7-10, 2002, ACM Press, pp. 131-136.
Patel, et al., "An Architectural Exploration of Via Patterned Gate Arrays, ISPD 2003", Apr. 6, 2003, pp. 184-189.
Pileggi, et al., "Exploring Regular Fabrics to Optimize the Perfointance-Cost Trade-Offs, Proceedings of the 40th ACM/IEEE Design Automation Conference (DAC) 2003", Jun. 2003, ACM Press, pp. 782-787.
Pham, D., et al., "FINFET Device Junction Formation Challenges," 2006 International Workshop on Junction Technology, pp. 73-77, Aug. 2006.
Poonawala, et al., "ILT for Double Exposure Lithography with Conventional and Novel Materials", 2007, SPIE Proceeding Series, vol. 6520; 65202Q.
Qian et al. "Advanced Physical Models for Mask Data Verification and Impacts on Physical Layout Synthesis" 2003. IEEE.
Ran, et al., "An Integrated Design Flow for a Via-Configurable Gate Array", 2004, IEEE, pp. 582-589.
Ran, et al., "Designing a Via-Configurable Regular Fabric", Custom Integrated Circuits Conference (CICC). Proceedings of the IEEE, Oct. 1, 2004, pp. 423-426.
Ran, et al., "On Designing Via-Configurable Cell Blocks for Regular Fabrics" Proceedings of the Design Automation Conference (DAC) 2004, Jun. 2004, ACM Press, s 198-203.
Ran, et al., "The Magic of a Via-Configurable Regular Fabric", Proceedings of the IEEE International Conference on Computer Design (ICCD) Oct. 2004.
Ran, et al., "Via-Configurable Routing Architectures and Fast Design Mappability Estimation for Regular Fabrics", 2005, IEEE, pp. 25-32.
Reis, et al., "Physical Design Methodologies for Performance Predictability and Manufacturability", Apr. 14-16, 2004, ACM Press, pp. 390-397.
Robertson, et al., "The Modeling of Double Patterning Lithographic Processes", 2007, SPIE Proceeding Series, vol. 6520; 65200J.
Rovner, "Design for Manufacturability in Via Programmable Gate Arrays", May 2003, Graduate School of Carnegie Mellon University.
Sengupta, "An Integrated CAD Framework Linking VLSI Layout Editors and Process Simulators", 1998, Thesis for Rice University, pp. 1-101.
Sengupta, et al., "An Integrated CAD Framework Linking VLSI Layout Editors and Process Simulators", 1996, SPIE Proceeding Series, vol. 2726; pp. 244-252.
Sherlekar, "Design Considerations for Regular Fabrics", Apr. 18-21, 2004, ACM Press, pp. 97-102.
Shi et al., "Understanding the Forbidden Pitch and Assist Feature Placement," Proc. of SPIE vol. 4562, 2002, pp. 968-979.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Sreedhar et al. " Statistical Yield Modeling for Sub-Wavelength Lithography", 2008, IEEE.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7-11, 2004, ACM Press, pp. 874-877.
Tian et al. "Model-Based Dummy Feature Placement for Oxide Chemical_Mechanical Polishing Manufacturability" 2000, ACM.
Tong, et al., "Regular Logic Fabrics for a Via Patterned Gate Array (VPGA), Custom Integrated Circuits Conference", Sep. 2003, Proceedings of the IEEE, pp. 53-56.
Vanleenhove, et al., "A Litho-Only Approach to Double Patterning", 2007, SPIE Proceeding Series, vol. 6520; 65202F.
Wang, et al., "Performance Optimization for Gridded-Layout Standard Cells", 2004, vol. 5567 SPIE.
Wang, J. et al., Standard Cell Layout with Regular Contact Placement, IEEE Trans. on Semicon. Mfg., vol. 17, No. 3, Aug. 2004.
Webb, Clair, "Layout Rule Trends and Affect upon CPU Design", 2006, vol. 6156 SPIE.
Webb, Clair, "45nm Design for Manufacturing," Intel Technology Journal, vol. 12, Issue 02, Jun. 17, 2008, ISSN 1535-864X, pp. 121-130.
Wenren, et al., "The Improvement of Photolithographic Fidelity of Two-dimensional Structures Though Double Exposure Method", 2007, SPIE Proceeding Series, vol. 6520; 652021.
Wilcox, et al., "Design for Manufacturability: A Key to Semiconductor Manufacturing Excellence", 1998, IEEE, pp. 308-313.
Wu, et al., "A Study of Process Window Capabilities for Two-dimensional Structures under Double Exposure Condition", 2007, SPIE Proceeding Series, vol. 6520; 65202O.

(56) References Cited

OTHER PUBLICATIONS

Xiong, et al., "The Constrained Via Minimization Problem for PCB and VLSI Design", 1988, ACM Press/IEEE, pp. 573-578.
Yamamaoto, et al., "New Double Exposure Technique without Alternating Phase Shift Mask", 2007, SPIE, Proceeding Series, vol. 6520; 652052P.
Yang, et al., "Interconnection Driven VLSI Module Placement Based on Quadratic Programming and Considering Congestion Using LFF Principles", 2004, IEEE, pp. 1243-1247.
Yao, et al., "Multilevel Routing With Redundant Via Insertion", Oct. 2006, IEEE, pp. 1148-1152.
Zheng, et al."Modeling and Analysis of Regular Symmetrically Structured Power/Ground Distribution Networks", DAC, Jun. 10-14, 2002, ACM Press, pp. 395-398.
Zhu, et al., "A Stochastic Integral Equation Method for Modeling the Rough Surface Effect on Interconnect Capacitance", 2004, IEEE.
Zhu, et al., "A Study of Double Exposure Process Design with Balanced Performance Parameters for Line/Space Applications", 2007, SPIE Proceeding Series, vol. 6520; 65202H.
Zuchowski, et al., "A Hybrid ASIC and FPGA Architecture", 2003, IEEE, pp. 187-194.
Firedberg, et al., "Modeling Within-Field Gate Length Spatial Variation for Process-Design Co-Optimization," 2005 Proc. of SPIE vol. 5756, pp. 178-188.
Hakko, et al., "Extension of the 2D-TCC Technique to Optimize Mask Pattern Layouts," 2008 Proc. of SPIE vol. 7028, 11 pages.
Kawashima, et al., "Mask Optimization for Arbitrary Patterns with 2D-TCC Resolution Enhancement Technique," 2008 Proc. of SPIE vol. 6924, 12 pages.
Rosenbluth, et al., "Optimum Mask and Source Patterns to Print a Given Shape," 2001 Proc. of SPIE vol. 4346, pp. 486-502.
Socha, et al., "Simultaneous Source Mask Optimization (SMO)," 2005 Proc. of SPIE vol. 5853, pp. 180-193.
Wong, et al., "Resolution Enhancement Techniques and Design for Manufacturability: Containing and Accounting for Variabilities in Integrated Circuit Creation," J. Micro/Nanolith. MEMS MOEMS, Jul.-Sep. 2007, vol. 6(3), 2 pages.
Yamazoe, ct al., "Resolution Enhancement by Aerial Image Approximation with 2D-TCC," 2007 Proc. of SPIE vol. 6730, 12 pages.
Yu, ct al., "True Process Variation Aware Optical Proximity Correction with Variational Lithography Modeling and Model Calibration," J. Micro/Nanolith. MEMS MOEMS, Jul.-Sep. 2007 vol. 6(3), 16 pages.
Alam, Syed M. et al., "A Comprehensive Layout Methodology and Layout-Specific Circuit Analyses for Three-Dimensional Integrated Circuits," Mar. 21, 2002.
Alam, Syed M. et al., "Layout-Specific Circuit Evaluation in 3-D Integrated Circuits," May 2003.
Aubusson, Russel, "Wafer-Scale Integration of Semiconductor Memory," Apr. 1979.
Bachtold, "Logic Circuits with Carbon," Nov. 9, 2001.
Baker, R. Jacob, "CMOS: Circuit Design, Layout, and Simulation (2nd Edition)," Nov. 1, 2004.
Baldi et al., "A Scalable Single Poly EEPROM Cell for Embedded Memory Applications," pp. 1-4, Fig. 1, Sep. 1997.
Cao, Ke, "Design for Manufacturing (DFM) in Submicron VLSI Design," Aug. 2007.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006.
Chang, Leland et al., "Stable SRAM Cell Design for the 32 nm Node and Beyond," Jun. 16, 2005.
Cheung, Peter, "Layout Design," Apr. 4, 2004.
Chinnery, David, "Closing the Gap Between ASIC & Custom: Tools and Techniques for High-Performance ASIC Design," Jun. 30, 2002.
Chou, Dyiann et al., "Line End Optimization through Optical Proximity Correction (OPC): A Case Study," Feb. 19, 2006.
Clein, Dan, "CMOS IC Layout: Concepts, Methodologies, and Tools," Dec. 22, 1999.
Cowell, "Exploiting Non-Uniform Access Time," Jul. 2003.
Das, Shamik, "Design Automation and Analysis of Three-Dimensional Integrated Circuits," May 1, 2004.
Dehaene, W. et al., "Technology-Aware Design of SRAM Memory Circuits," Mar. 2007.
Deng, Liang et al., "Coupling-aware Dummy Metal Insertion for Lithography," p. 1, col. 2, 2007.
Devoivre et al., "Validated 90nm CMOS Technology Platform with Low-k Copper Interconnects for Advanced System-on-Chip (SoC)," 2002.
Enbody, R. J., "Near-Optimal n-Layer Channel Routing," 1986.
Ferretti, Marcos et al., "High Performance Asynchronous ASIC Back-End Design Flow Using Single-Track Full-Buffer Standard Cells," Apr. 23, 2004.
Garg, Manish et al., "Litho-driven Layouts for Reducing Perfolinance Variability," p. 2, Figs. 2b-2c, May 23, 2005.
Greenway, Robert et al., "32nm 1-D Regular Pitch SRAM Bitcell Design for Interference-Assisted Lithography," 2008.
Gupta et al., "Modeling Edge Placement Error Distribution in Standard Cell Library," Feb. 23-24, 2006.
Grad, Johannes et al., "A standard cell library for student projects," Proceedings of the 2003 IEEE International Conference on Microelectronic Systems Education, Jun. 2, 2003.
Hartono, Roy et al., "Active Device Generation for Automatic Analog Layout Retargeting Tool," May 13, 2004.
Hartono, Roy et al., "IPRAIL—Intellectual Property Reuse-based Analog IC Layout Automation," Mar. 17, 2003.
Hastings, Alan, "The Art of Analog Layout (2nd Edition)," Jul. 4, 2005.
Hurata et al., "A Genuine Design Manufacturability Check for Designers," 2006.
Institute of Microelectronic Systems, "Digital Subsystem Design," Oct. 13, 2006.
Ishida, M. et al., "A Novel 6T-SRAM Cell Technology Designed with Rectangular Patterns Scalable beyond 0.18 pm Generation and Desirable for Ultra High Speed Operation," 1998.
Jakusovszky, "Linear IC Parasitic Element Simulation Methodology," Oct. 1, 1993.
Jangkrajarng, Nuttorn et al., "Template-Based Parasitic-Aware Optimization and Retargeting of Analog and RF Integrated Circuit Layouts," Nov. 5, 2006.
Kahng, Andrew B., "Design Optimizations DAC-2006 DFM Tutorial, part V)," 2006.
Kang, Sung-Mo et al., "CMOS Digital Integrated Circuits Analysis & Design," Oct. 29, 2002.
Kottoor, Mathew Francis, "Development of a Standard Cell Library based on Deep Sub-Micron SCMOS Rules using Open Source Software (MS Thesis)," Aug. 1, 2005.
Kubicki, "Intel 65nm and Beyond (or Below): IDF Day 2 Coverage (available at http://www.anandtech.com/show/1468/4)," Sep. 9, 2004.
Kuhn, Kelin J., "Reducing Variation in Advanced Logic Technologies: Approaches to Process and Design for Manufacturability of Nanoscale CMOS," p. 27, Dec. 12, 2007.
Kurokawa, Atsushi et al., "Dummy Filling Methods for Reducing Interconnect Capacitance and Number of Fills, Proc. of ISQED," pp. 586-591, 2005.
Lavin, Mark, "Open Access Requirements from RDR Design Flows," Nov. 11, 2004.
Liebmann, Lars et al., "Layout Methodology Impact of Resolution Enhancement Techniques," pp. 5-6, 2003.
Liebmann, Lars et al., "TCAD development for lithography resolution enhancement," Sep. 2001.
Lin, Chung-Wei et al., "Recent Research and Emerging Challenges in Physical Design for Manufacturability/Reliability," Jan. 26, 2007.
McCullen, Kevin W., "Layout Techniques for Phase Correct and Gridded Wiring," pp. 13, 17, Fig. 5, 2006.
MOSIS, "Design Rules MOSIS Scalable CMOS (SCMOS) (Revision 8.00)," Oct. 4, 2004.

(56) References Cited

OTHER PUBLICATIONS

MOSIS, "MOSIS Scalable CMOS (SCMOS) Design Rules (Revision 7.2)."
Muta et al., "Manufacturability-Aware Design of Standard Cells," pp. 2686-2690, Figs. 3, 12, Dec. 2007.
Na, Kee-Yeol et al., "A Novel Single Polysilicon EEPROM Cell With a Polyfinger Capacitor," Nov. 30, 2007.
Pan et al., "Redundant Via Enahnced Maze Routing for Yield Improvement," 2005.
Park, Tae Hong, "Characterization and Modeling of Pattern Dependencies in Copper Interconnects for Integrated Circuits," Ph.D. Thesis, MIT, 2002.
Patel, Chetan, "An Architectural Exploration of Via Patterned Gate Arrays (CMU Master's Project)," May 2003.
Pease, R. Fabian et al., "Lithography and Other Patterning Techniques for Future Electronics," 2008.
Serrano, Diego Emilio, Pontificia Universidad Javeriana Facultad De Ingenieria, Departamento De Electronica, "Diselio De Multiplicador 4×8 en VLSI, Introduccion al VLSI," 2006.
Pramanik, "Impact of layout on variability of devices for sub 90nm technologies," 2004.
Pramanik, Dipankar et al., "Lithography-driven layout of logic cells for 65-nm node (SPIE Proceedings vol. 5042)," Jul. 10, 2003.
Roy et al., "Extending Aggressive Low-K1 Design Rule Requirements For 90 and 65 Nm Nodes Via Simultaneous Optimization of Numerical Aperture, Illumination and Optical Proximity Correction," J.Micro/Nanolith, MEMS MOEMS, 4(2), 023003, Apr. 26, 2005.
Saint, Christopher et al., "IC Layout Basics: A Practical Guide," Chapter 3, Nov. 5, 2001.
Saint, Christopher et al., "IC Mask Design: Essential Layout Techniques," 2002.
Scheffer, "Physical CAD Changes to Incorporate Design for Lithography and Manufacturability," Feb. 4, 2004.
Smayling, Michael C., "Part 3: Test Structures, Test Chips, In-Line Metrology & Inspection," 2006.
Spence, Chris, "Full-Chip Lithography Simulation and Design Analysis: How OPC is changing IC Design, Emerging Lithographic Technologies IX," May 6, 2005.
Subramaniam, Anupama R., "Design Rule Optimization of Regular layout for Leakage Reduction in Nanoscale Design," pp. 474-478, Mar. 24, 2008.
Tang, C. W. et al., "A compact large signalmodel of LDMOS," 2002.
Taylor, Brian et al., "Exact Combinatorial Optimization Methods for Physical Design of Regular Logic Bricks," Jun. 8, 2007.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, 2001.
Torres, J. A. et al., "RET Compliant Cell Generation for sub-130nm Processes," 2002.
Uyemura, John P., "Introduction to VLSI Circuits and Systems," Chapters 2, 3, 5, and Part 3, 2002.
Uyemura, John, "Chip Design for Submicron VLSI: CMOS Layout and Simulation," Chapters 2-5, 7-9, Feb. 8, 2005.
Verhaegen et al., "Litho Enhancements for 45nm-nod MuGFETs," Aug. 1, 2005.
Wong, Ban P., "Bridging the Gap between Dreams and Nano-Scale Reality (DAC-2006 DFM Tutorial)," 2006.
Wang, Dunwei et al., "Complementary Symmetry Silicon Nanowire Logic: Power-Efficient Inverters with Gain," 2006.
Wang, Jun et al., "Effects of grid-placed contacts on circuit performance," pp. 135-139, Figs. 2,4-8, Feb. 28, 2003.
Wang, Jun et al., "Standard cell design with regularly placed contacts and gates (SPIE vol. 5379)," 2004.
Wang, Jun et al., "Standard cell design with resolution-enhancement-technique-driven regularly placed contacts and gates," J. Micro/Nanolith, MEMS MOEMS, 4(1), 013001, Mar. 16, 2005.
Watson, Bruce, "Challenges and Automata Applications in Chip-Design Software," pp. 38-40, 2007.
Weste, Neil et al., "CMOS VLSI Design: A Circuits and Systems Perspective, 3rd Edition," May 21, 2004.
Wingerden, Johannes van, "Experimental verification of improved printability for litho-driven designs," Mar. 14, 2005.
Wong, Alfred K., "Microlithography: Trends, Challenges, Solutions and Their Impact on Design," 2003.
Xu, Gang, "Redundant-Via Enhanced Maze Routing for Yield Improvement," 2005.
Yang, Jie, "Manufacturability Aware Design," pp. 93, 102, Fig. 5.2, 2007.
Yongshun, Wang et al., "Static Induction Devices with Planar Type Buried Gate," 2004.
Zobrist, George (editor), "Progress in Computer Aided VLSI Design: Implementations (Ch. 5)," 1990.
International Search Report and Written Opinion for PCT Application No. PCT/US2013/021345.
Petley, Graham, "VLSI and ASIC Technology Standard Cell Library Design," from website www.vlsitechnology.org, Jan. 11, 2005.
Liebmann, Lars, et al., "Layout Optimization at the Pinnacle of Optical Lithography," Design and Process Integration for Microelectronic Manufacturing II, Proceedings of SPIE vol. 5042, Jul. 8, 2003.
Kawasaki, H., et al., "Challenges and Solutions of FinFET Integration in an SRAM Cell and a Logic Circuit for 22 nm node and beyond," Electron Devices Meeting (IEDM), 2009 IEEE International, IEEE, Piscataway, NJ, USA, Dec. 7, 2009, pp. 1-4.

\* cited by examiner

105

View A-A

View B-B

View C-C ies US 9,563,733 B2

CELL CIRCUIT AND LAYOUT WITH LINEAR FINFET STRUCTURES

CLAIM OF PRIORITY

This application claims priority under 35 U.S.C. 119(e) to U.S. Provisional Patent Application No. 61/176,058, filed May 6, 2009, entitled "Cell Layout and Scaling Using Linear Finfet Structures," the disclosure of which is incorporated herein by reference in its entirety.

BACKGROUND

It is known that optical lithography has reached the end of its capability at the 193 nm light wavelength and 1.35 numerical aperture (NA) immersion system. The minimum straight line resolution capability of this equipment is approximately 40 nm with an approximate 80 nm feature-to-feature pitch. A feature-to-feature pitch requirement lower than about 80 nm would require multiple patterning steps for a given structure type within a given chip level. Also, line end resolution becomes more challenging as lithography is pushed toward its resolution limits. One solution to line end shortening is to add a subsequent patterning step to cut features so as to form the line ends. Such line end cutting allows two line ends to be placed in closer proximity, and therefore may improve overall feature placement density, but at the cost of an additional patterning step. It should be understood that the added lithography steps for multiple patterning and/or line end cutting increases manufacturing cost, possibly to the point where any improvement in feature placement density is financially negated.

In semiconductor device layout, a typical metal line pitch at the 32 nm critical dimension is approximately 100 nm. In order to achieve the cost benefit of feature scaling, a scaling factor of 0.7 to 0.75 is desirable. The scaling factor of about 0.75 to reach the 22 nm critical dimension would require a metal line pitch of about 75 nm, which is below the capability of current single exposure lithography systems and technology.

SUMMARY

In one embodiment, a cell circuit of a semiconductor device is disclosed. The cell circuit includes a substrate, and a number of linear-shaped diffusion fins defined to extend over the substrate in a first direction so as to extend parallel to each other. Each of the number of linear-shaped diffusion fins is defined to project upward from the substrate along their extent in the first direction. The cell circuit also includes a number of gate level structures defined to extend in a conformal manner over some of the number of linear-shaped diffusion fins. Portions of each gate level structure that extend over any of the number of linear-shaped diffusion fins extend in a second direction that is substantially perpendicular to the first direction. Portions of each gate level structure that extend over any of the number of linear-shaped diffusion fins form gate electrodes of a corresponding transistor.

In one embodiment, a semiconductor device cell layout is disclosed. The cell layout includes a diffusion level layout and a gate level layout. The diffusion level layout includes a number of diffusion fin layout shapes defined to extend in only a first direction across the cell layout so as to extend parallel to each other. Each of the number of diffusion fin layout shapes corresponds to diffusion fin structures defined to project upward from a substrate along their extent in the first direction. The gate level layout includes a number of gate level layout shapes defined to extend in a second direction across the cell layout that is substantially perpendicular to the first direction. Each of the gate level layout shapes corresponds to gate level structures defined to extend in a conformal manner over some of the diffusion fin structures that correspond to the diffusion fin layout shapes. Portions of each gate level structure that extend over any of the diffusion fin structures form gate electrodes of a corresponding transistor.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
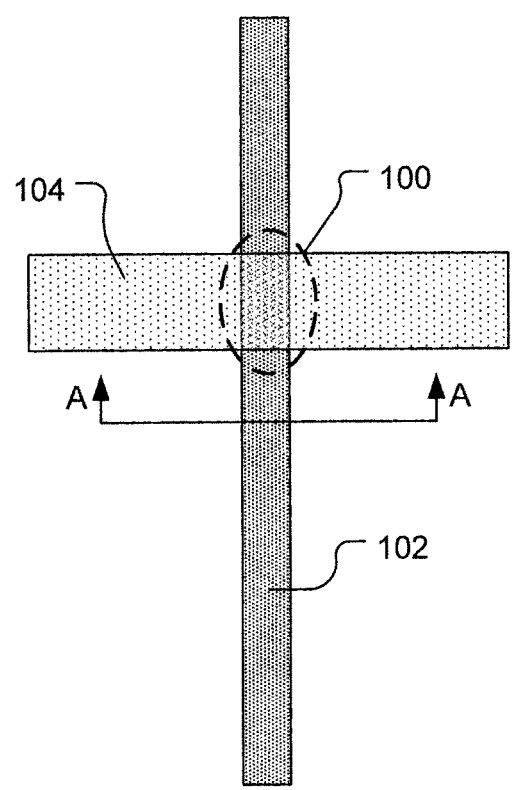
FIGS. 1A and 1B show a layout view of a finfet transistor, in accordance with one embodiment of the present invention.
Figure 1B:
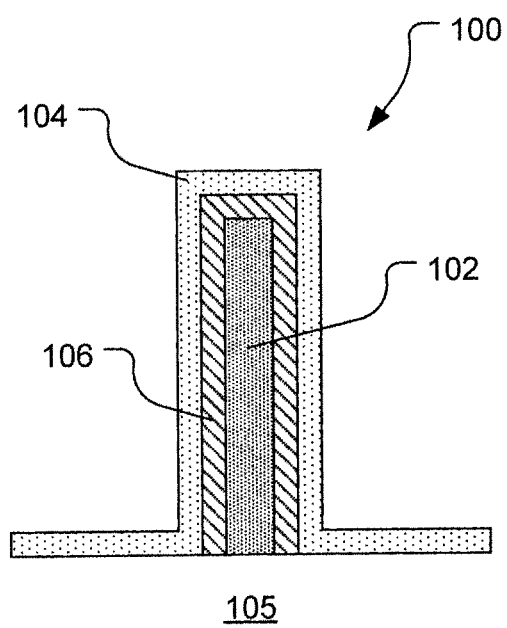

A "finfet" is a transistor constructed from a vertical silicon island. The finfet transistor can also be referred to as a tri-gate transistor. FIGS. 1A and 1B show a layout view of a finfet transistor 100, in accordance with one embodiment of the present invention. The finfet transistor 100 is constructed from a diffusion island 102 and a gate electrode layer 104. The diffusion island 102 projects vertically upward from a substrate 105, as shown in FIG. 1B. A gate oxide layer 106 is disposed between the diffusion island 102 and the gate electrode layer 104. The diffusion island 102 can be doped to form either a p-type transistor or an n-type transistor. The portion of the gate electrode layer 104 that covers the diffusion island 102 forms the gate electrode of the finfet transistor 100. Therefore, the gate electrode of the finfet transistor 100 exists on three sides of the diffusion island 102, thereby providing for control of the finfet transistor channel from three sides, as opposed to from one side as in a non-finfet transistor.

Transistor scaling has slowed below the 45 nanometers (nm) critical dimension due to gate oxide limitations and/or source/drain leakage scaling issues. The finfet transistor mitigates these issues by controlling the channel of the finfet transistor from three sides. The increased electrical fields in the channel of the finfet transistor improve the relationship between I-on (on drive current) and I-off (sub-threshold leakage current). Finfet transistors can be employed at the 22 nm critical dimension and below. However, due to their vertical projection, finfet transistors can have restricted placement in various circuit layouts. For instance, there can be a required finfet-to-finfet minimum spacing and/or a required finfet-to-finfet minimum pitch, among other restrictions. Embodiments are disclosed herein for cell layouts that utilize finfet transistors in a manner which complements layout scaling.

Figure 2A:
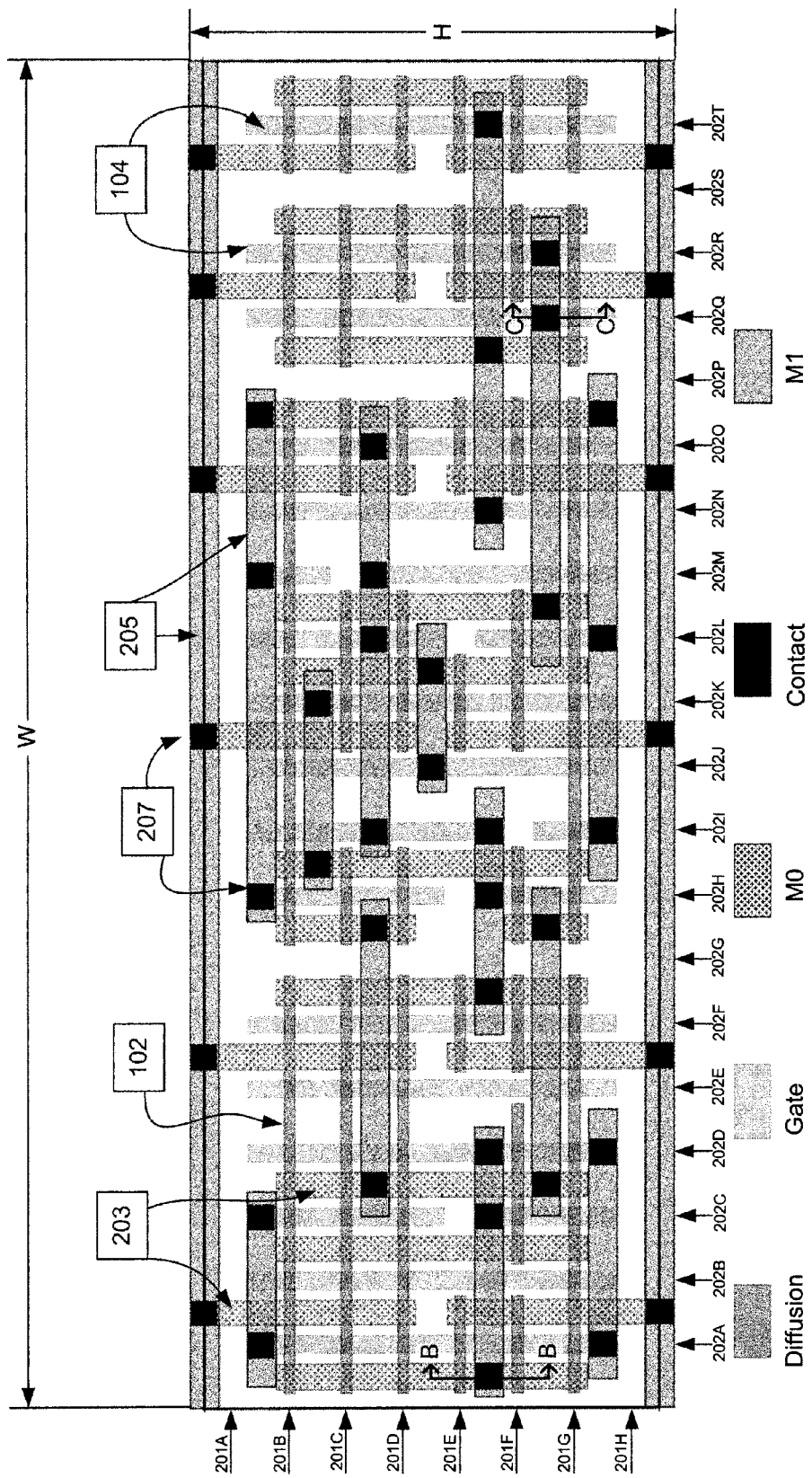
FIG. 2A shows an exemplary cell layout incorporating finfet transistors, in accordance with one embodiment of the present invention.

FIG. 2A shows an exemplary cell layout incorporating finfet transistors, in accordance with one embodiment of the present invention. The cell layout is defined by a cell width W and a cell height H. The cell layout includes a diffusion level within which a number of diffusion islands 102 are defined for subsequent formation of finfet transistors and associated connections. The diffusion islands 102 are also referred to as diffusion fins 102. In an as-drawn layout state, the diffusion fins 102 are linear-shaped. The diffusion fins 102 are oriented to be parallel to each other such that their lengths extend in the direction of the cell width W.

In one embodiment, the diffusion fins 102 are placed along a number of diffusion tracks 201A-201H. The diffusion tracks 201A-201H represent virtual lines that extend in the direction of the cell width W and are equally spaced at a fixed pitch. The pitch of the diffusion tracks 201A-201H is related to the cell height H, such that the diffusion track pitch can be continued across cell boundaries. Therefore, the diffusion fins 102 for multiple neighboring cells will be placed in accordance with a common global set of equally spaced diffusion tracks, thereby facilitating chip level manufacturing of the diffusion fins 102 in multiple cells.

It should be understood that the diffusion fins 102 can be placed as needed, so long as they are placed in accordance with the diffusion tracks 201A-201H which have the controlled spatial relationship with the cell height H. Therefore, some diffusion tracks 201A-201H may not have a diffusion fin 102 placed thereon. Also, portions of some diffusion tracks 201A-201H may be vacant with regard to diffusion fin 102 placement. In other words, some diffusion tracks 201A-201H will have one or more portions occupied by diffusion fins 102 and one or more portions not occupied by diffusion fins 102.

The cell layout also includes a number of linear-shaped gate electrode structures 104. The linear-shaped gate electrode structures 104 extend in a substantially perpendicular direction to the diffusion fins 102, i.e., in the direction of the cell height H. The linear-shaped gate electrode structures 104 wrap over the diffusion fins 102 to form gate electrodes of finfet transistors. It should be understood that an appropriate gate oxide material is disposed between the diffusion fins 102 and the gate electrode structures 104 formed thereover.

In one embodiment, the linear-shaped gate electrode structures 104 are placed in accordance with a gate level virtual grate defined by a set of parallel equally spaced virtual lines 202A-202T that extend in the direction of the cell height H. The set of virtual lines 202A-202T of the gate level virtual grate are spaced at a fixed gate pitch. In one embodiment, the gate pitch is related to the cell width W, such that the gate pitch can be continued across cell boundaries. Therefore, the gate electrode structures 104 for multiple neighboring cells will be placed in accordance with a common global set of equally spaced gate level virtual grate lines, thereby facilitating chip level manufacturing of the linear-shaped gate electrode structures 104 in multiple cells.

It should be understood that some of the gate level virtual grate lines 202A-202T may be occupied by gate electrode structures 104, while others of the gate level virtual grate lines 202A-202T are left vacant. Also, along a given gate level virtual grate line 202A-202T, one or more linear-shaped gate electrode structures 104 can be placed as needed and spaced apart as needed.

The cell layout also includes a number of linear-shaped local interconnect structures 203. The local interconnect structures 203 are oriented parallel to the gate electrode structures 104. In one embodiment, placement of the local interconnect structures 203 is defined to be out of phase from placement of the gate electrode structures 104 by one-half of the gate pitch. Thus, in this embodiment, each local interconnect structure 203 is centered between its neighboring gate level virtual grate lines 202A-202T. And, if its neighboring gate level virtual grate lines 202A-202T are occupied by gate electrode structures 104, the local interconnect structure 203 will be correspondingly centered between the neighboring gate electrode structures 104. Therefore, in this embodiment, adjacently placed local interconnect structures 203 will have a center-to-center spacing equal to the gate pitch.

In one embodiment, the cell layout also includes a number of linear-shaped metal 1 (M1) interconnect structures 205. The M1 interconnect structures 205 are oriented parallel to the diffusion fins 102 and perpendicular to the gate electrode structures 104. In one embodiment, placement of the M1 interconnect structures 205 is defined to be out of phase from placement of the diffusion fins 102 by one-half of the diffusion track 201A-201H pitch. Thus, in this embodiment, each M1 interconnect structure 205 is centered between its neighboring diffusion tracks 201A-201H. And, if its neighboring diffusion tracks 201A-201H are occupied by diffusion fins 102, the M1 interconnect structure 205 will be correspondingly centered between its neighboring diffusion fins 102, albeit within a higher chip level. Therefore, in this embodiment, adjacently placed M1 interconnect structures 205 will have a center-to-center spacing equal to the diffusion track pitch. In one embodiment, the M1 interconnect structure 205 pitch, and hence the diffusion track pitch, is set at the single exposure lithographic limit, e.g., 80 nm for 193 nm wavelength light and 1.35 NA. In this embodiment, no double exposure lithography, i.e., multiple patterning, is required to manufacture the M1 interconnect structures 205.

The cell layout also includes a number of contacts 207 defined to connect various M1 interconnect structures 205 to various local interconnect structures 203 and gate electrode structures 104, thereby providing electrical connectivity between the various finfet transistors as necessary to implement the logic function of the cell. In one embodiment, the contacts 205 are defined to satisfy single exposure lithographic limits. For example, in one embodiment, layout features to which the contacts 207 are to connect are sufficiently separated to enable single exposure manufacture of the contacts 207. For instance, the M1 interconnect structures 205 are defined such that their line ends which are to receive contacts 207 are sufficiently separated from neighboring M1 interconnect structure 205 line ends which are also to receive contacts 207, such that a spatial proximity between the contacts 207 is sufficiently large to enable single exposure lithography of the contacts 207. In one embodiment, neighboring contacts 207 are separated from each other by at least 1.5 times the gate pitch. It should be appreciated that line end cutting and the associated increased expense of double exposure lithography can be eliminated by sufficiently separating opposing line ends of the M1 interconnect structures 205.

As previously mentioned, the cell height H and diffusion track pitch, i.e., diffusion fin pitch, are related. In one embodiment, the cell height H is an integer multiple of the diffusion track pitch. The cell layout techniques described herein can be used to reduce the cell height H by the approximate difference between the single exposure lithographic capability and an applicable scaling requirement. For example, consider that the cell height H is based on the single exposure straight line lithographic limit, e.g., 80 nm diffusion fin pitch. Therefore, the diffusion track pitch of the cell cannot be scaled down further without incurring the cost of multiple patterning. However, the cell layout techniques described herein can be utilized to scale down the overall size of the cell layout while maintaining the single exposure straight line lithographic limit with regard to the diffusion track pitch.

For example, if a 9 diffusion track cell was used at 32 nm, then a scaled down version of the cell having 8 tracks at 22 nm is created to provide the overall cell layout scaling requirements. Specifically, the M1 interconnect structure 205 layout of the cell is drawn in fewer tracks, e.g., 8 tracks rather than 9 tracks, and the opposing line ends of the M1 interconnect structures 205 are arranged so that the single exposure lithography design rules can be satisfied. Reduction of the cell height H by one diffusion track can add up to significant layout area savings across the chip.

Figure 2B:
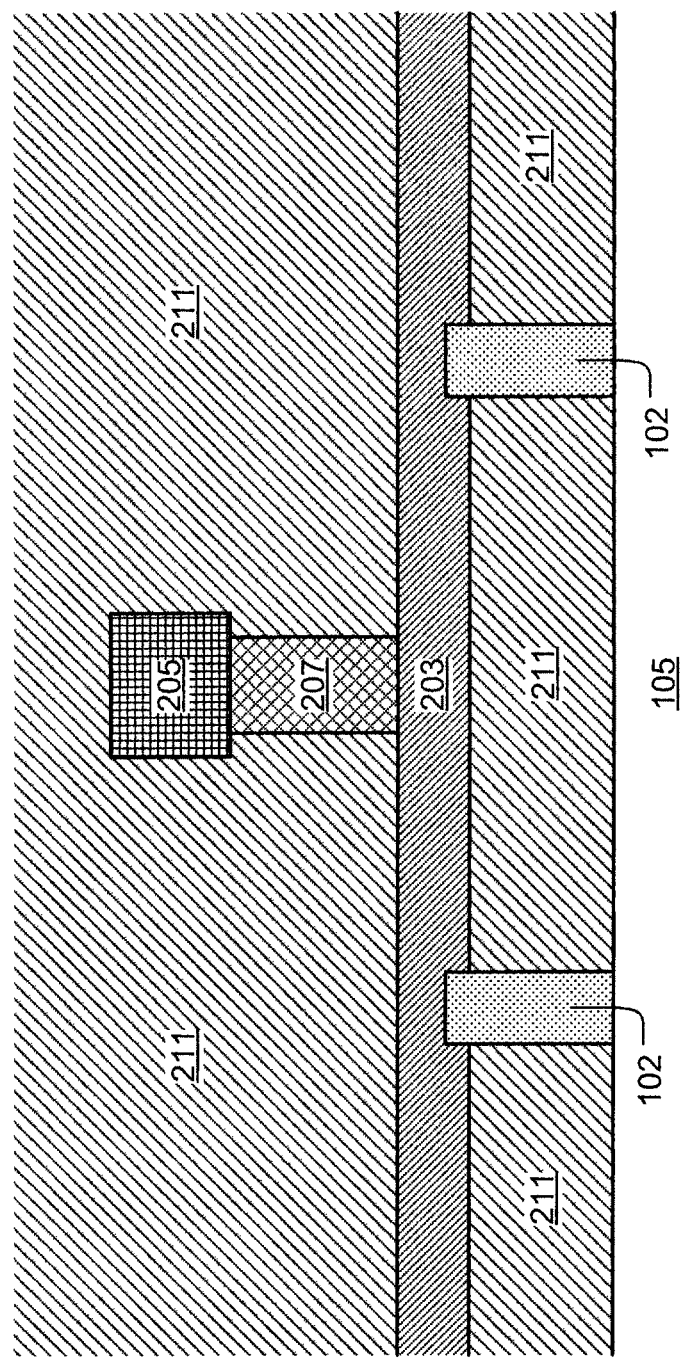
FIG. 2B shows a vertical cross-section view B-B as called out in FIG. 2A, in accordance with one embodiment of the present invention.

FIG. 2B shows a vertical cross-section view B-B as called out in FIG. 2A, in accordance with one embodiment of the present invention. The diffusion fins 102 are shown to project upward from the substrate 105. An insulating material 211, such as an oxide, is disposed between and around the diffusion fins 102 to provide structural support and electrical insulation. The local interconnect feature 203 is shown to extend perpendicular to the diffusion fins 102 and across the tops of the diffusion fins 102 so as to establish electrical connections between the local interconnect feature 203 and each of the diffusion fins 102. The contact 207 is shown to extend vertically through the layout to electrically connect the M1 interconnect structure 205 to the local interconnect structure 203. The contact 207 and M1 interconnect structure 205 are also surrounded by the insulating material 211, which again provides structural support and electrical insulation. It should be appreciated that the M1 interconnect structure 205 is positioned in a centered manner with respect to its neighboring underlying diffusion fins 102, as discussed above.

Figure 2C:
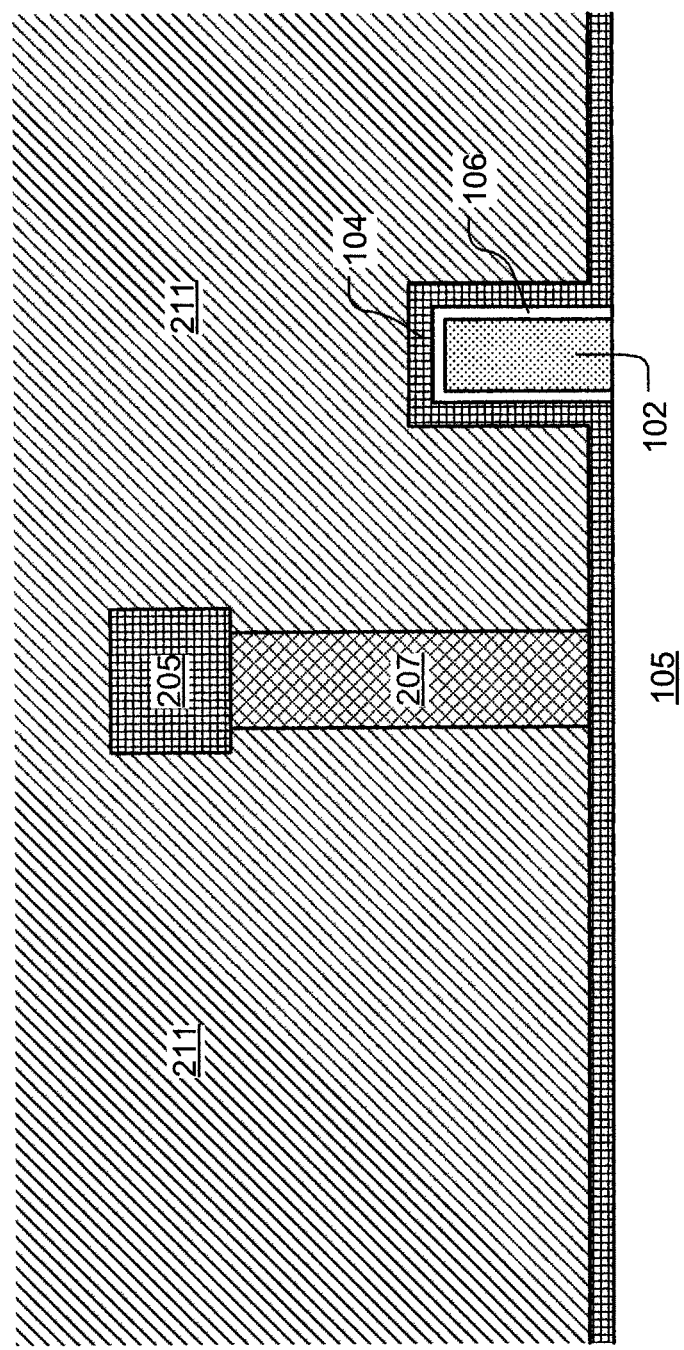
FIG. 2C shows a vertical cross-section view C-C as called out in FIG. 2A, in accordance with one embodiment of the present invention.

FIG. 2C shows a vertical cross-section view C-C as called out in FIG. 2A, in accordance with one embodiment of the present invention. The diffusion fin 102 is shown to project upward from the substrate 105. The gate oxide material 106 is disposed conformally over the diffusion fin 102. The gate electrode structure 104 is shown to extend perpendicular to the diffusion fin 102 and conformally over the diffusion fin 102. The contact 207 is shown to extend vertically to electrically connect the M1 interconnect structure 205 to the gate electrode structure 104. The insulating material 211, such as an oxide, is disposed over and around the gate electrode structure 104, the contact 207, and the M1 interconnect structure 205 to provide structural support and electrical insulation.

It should be understood that the relative sizes of the different layout features as shown in FIGS. 2A-2C are exemplary, and in no way limit the principles of the present invention as disclosed herein. For example, in other embodiments, the M1 power lines shown at the top and bottom of the cell layout in FIG. 2A can be of different width, e.g., larger width, than the M1 lines within an interior of the cell. Additionally, the relative vertical heights of the layout features as shown in the cross-sections of FIGS. 2B and 2C can vary from what is depicted therein. For example, in FIG. 2C, the gate electrode 104 may extend further vertically than what is shown.

Restricted Gate Level Layout Architecture

The cell layout incorporating finfet transistors, as discussed above, can implemented a restricted gate level layout architecture. For the gate level, a number of parallel virtual lines are defined to extend across the layout. These parallel virtual lines are referred to as gate electrode tracks, as they are used to index placement of gate electrodes of various transistors within the layout. In one embodiment, such as the cell layout discussed above with regard to FIG. 2A, the parallel virtual lines which form the gate electrode tracks are defined by a perpendicular spacing therebetween equal to a specified gate electrode pitch. Therefore, placement of gate electrode segments on the gate electrode tracks corresponds to the specified gate electrode pitch. In another embodiment the gate electrode tracks can be spaced at variable pitches greater than or equal to a specified gate electrode pitch.

Figure 3A:
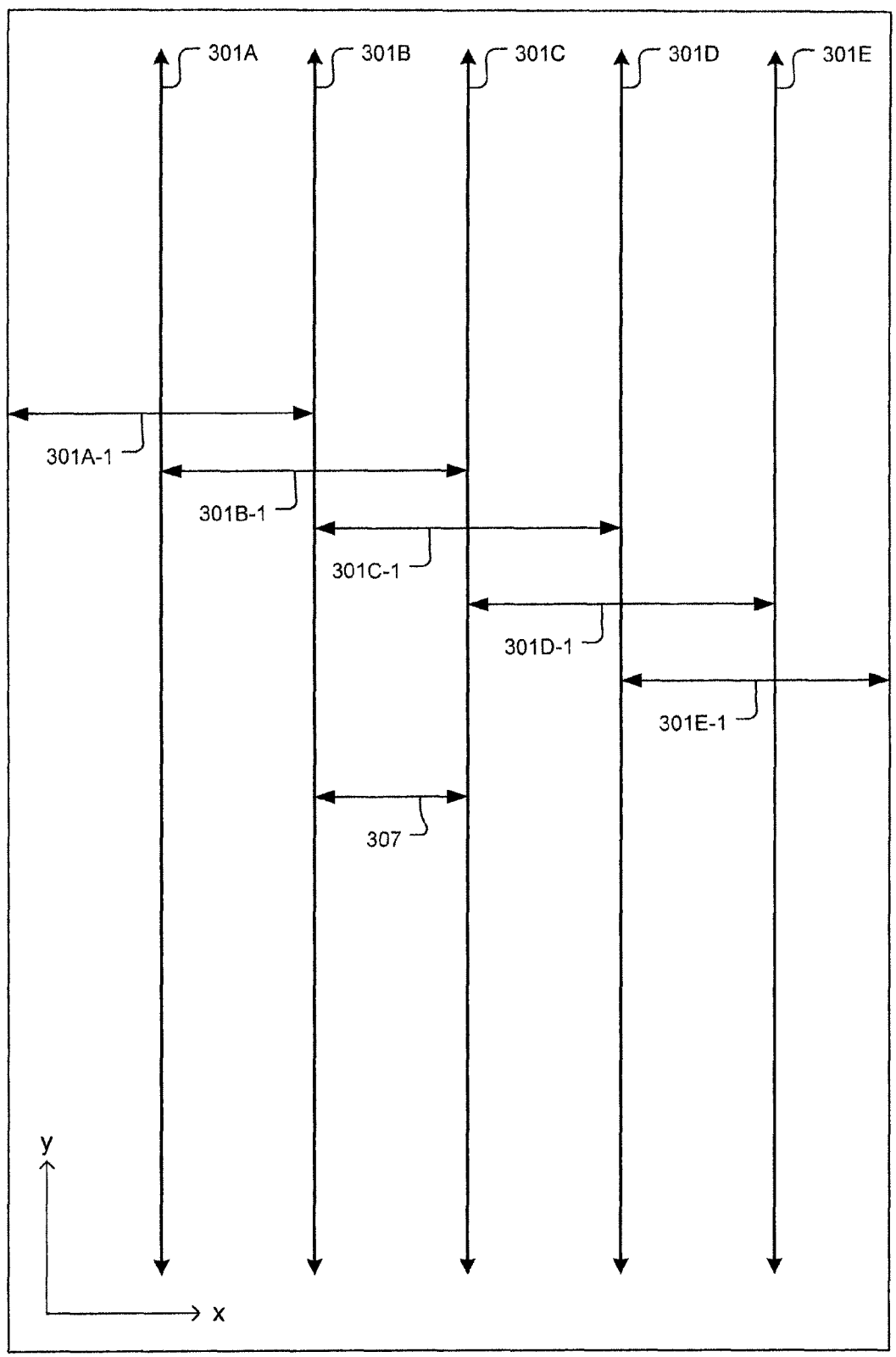
FIG. 3A shows an example of gate electrode tracks defined within the restricted gate level layout architecture, in accordance with one embodiment of the present invention.

FIG. 3A shows an example of gate electrode tracks 301A-301E defined within the restricted gate level layout architecture, in accordance with one embodiment of the present invention. Gate electrode tracks 301A-301E are formed by parallel virtual lines that extend across the gate level layout of the chip, with a perpendicular spacing therebetween equal to a specified gate electrode pitch 307.

Within the restricted gate level layout architecture, a gate level feature layout channel is defined about a given gate electrode track so as to extend between gate electrode tracks adjacent to the given gate electrode track. For example, gate level feature layout channels 301A-1 through 301E-1 are defined about gate electrode tracks 301A through 301E, respectively. It should be understood that each gate electrode track has a corresponding gate level feature layout channel. Also, for gate electrode tracks positioned adjacent to an edge of a prescribed layout space, e.g., adjacent to a cell boundary, the corresponding gate level feature layout channel extends as if there were a virtual gate electrode track outside the prescribed layout space, as illustrated by gate level feature layout channels 301A-1 and 301E-1. It should be further understood that each gate level feature layout channel is defined to extend along an entire length of its corresponding gate electrode track. Thus, each gate level feature layout channel is defined to extend across the gate level layout within the portion of the chip to which the gate level layout is associated.

Within the restricted gate level layout architecture, gate level features associated with a given gate electrode track are defined within the gate level feature layout channel associated with the given gate electrode track. A contiguous gate level feature can include both a portion which defines a gate electrode of a transistor, i.e., of a finfet transistor as disclosed herein, and a portion that does not define a gate electrode of a transistor. Thus, a contiguous gate level feature can extend over both a diffusion region, i.e., diffusion fin, and a dielectric region of an underlying chip level.

In one embodiment, each portion of a gate level feature that forms a gate electrode of a transistor is positioned to be substantially centered upon a given gate electrode track. Furthermore, in this embodiment, portions of the gate level feature that do not form a gate electrode of a transistor can be positioned within the gate level feature layout channel associated with the given gate electrode track. Therefore, a given gate level feature can be defined essentially anywhere within a given gate level feature layout channel, so long as gate electrode portions of the given gate level feature are centered upon the gate electrode track corresponding to the given gate level feature layout channel, and so long as the given gate level feature complies with design rule spacing requirements relative to other gate level features in adjacent gate level layout channels. Additionally, physical contact is prohibited between gate level features defined in gate level feature layout channels that are associated with adjacent gate electrode tracks.

Figure 3B:
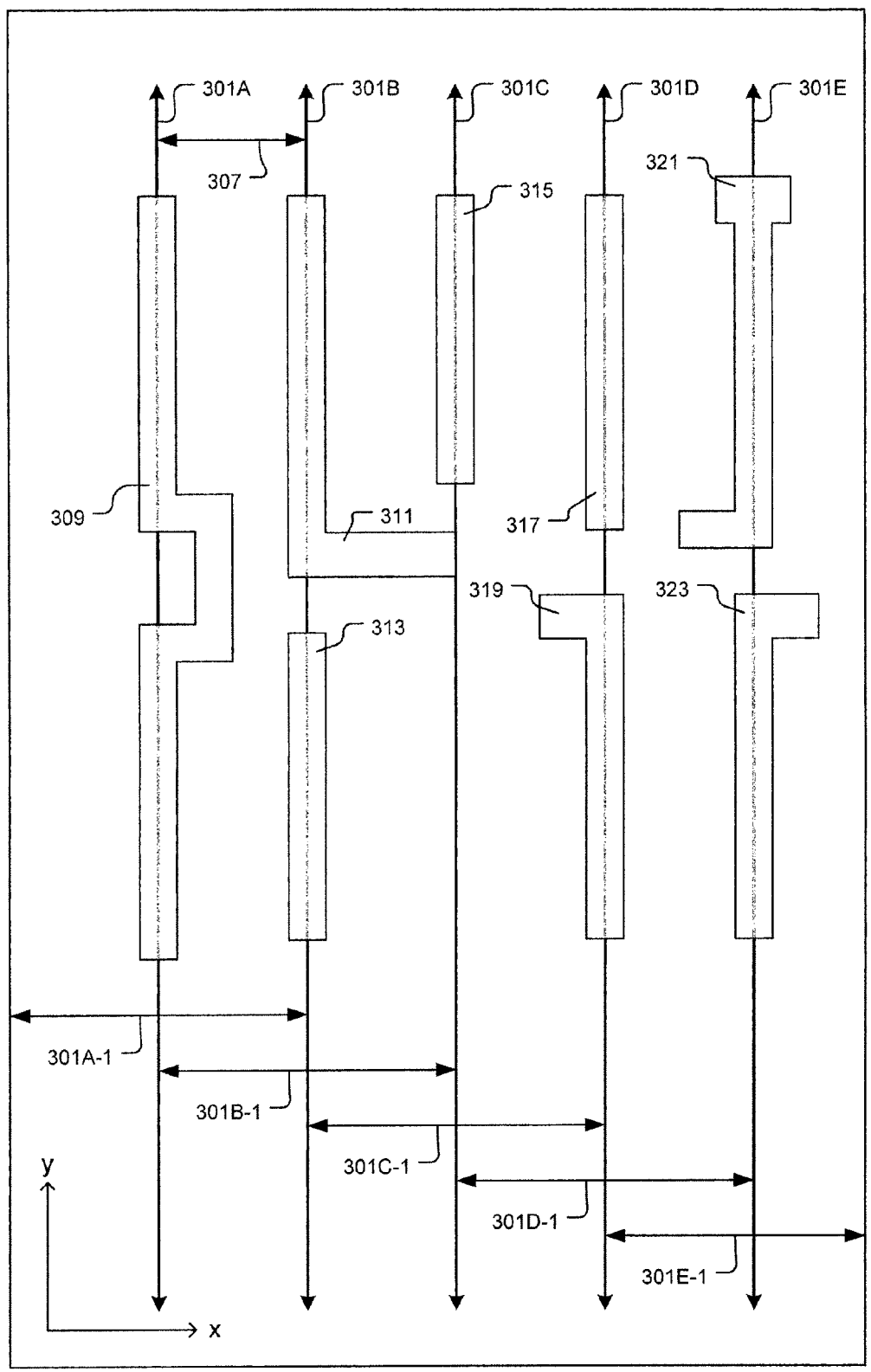
FIG. 3B shows the exemplary restricted gate level layout architecture of FIG. 3A with a number of exemplary gate level features defined therein, in accordance with one embodiment of the present invention.

FIG. 3B shows the exemplary restricted gate level layout architecture of FIG. 3A with a number of exemplary gate level features 309-323 defined therein, in accordance with one embodiment of the present invention. The gate level feature 309 is defined within the gate level feature layout channel 301A-1 associated with gate electrode track 301A. The gate electrode portions of gate level feature 309 are substantially centered upon the gate electrode track 301A. Also, the non-gate electrode portions of gate level feature 309 maintain design rule spacing requirements with gate level features 311 and 313 defined within adjacent gate level feature layout channel 301B-1. Similarly, gate level features 311-323 are defined within their respective gate level feature layout channel, and have their gate electrode portions substantially centered upon the gate electrode track corresponding to their respective gate level feature layout channel. Also, it should be appreciated that each of gate level features 311-323 maintains design rule spacing requirements with gate level features defined within adjacent gate level feature layout channels, and avoids physical contact with any another gate level feature defined within adjacent gate level feature layout channels.

A gate electrode corresponds to a portion of a respective gate level feature that extends over a diffusion structure, i.e., over a diffusion fin, wherein the respective gate level feature is defined in its entirety within a gate level feature layout channel. Each gate level feature is defined within its gate level feature layout channel without physically contacting another gate level feature defined within an adjoining gate level feature layout channel. As illustrated by the example gate level feature layout channels 301A-1 through 301E-1 of FIG. 3B, each gate level feature layout channel is associated with a given gate electrode track and corresponds to a layout region that extends along the given gate electrode track and perpendicularly outward in each opposing direction from the given gate electrode track to a closest of either an adjacent gate electrode track or a virtual gate electrode track outside a layout boundary.

Some gate level features may have one or more contact head portions defined at any number of locations along their length. A contact head portion of a given gate level feature is defined as a segment of the gate level feature having a height and a width of sufficient size to receive a gate contact structure. In this instance, "width" is defined across the substrate in a direction perpendicular to the gate electrode track of the given gate level feature, and "height" is defined across the substrate in a direction parallel to the gate electrode track of the given gate level feature. The gate level feature width and height may or may not correspond to the cell width W and cell height H, depending on the orientation of the gate level features within the cell. It should be appreciated that a contact head of a gate level feature, when viewed from above, can be defined by essentially any layout shape, including a square or a rectangle. Also, depending on layout requirements and circuit design, a given contact head portion of a gate level feature may or may not have a gate contact defined thereabove.

A gate level of the various embodiments disclosed herein is defined as a restricted gate level, as discussed above. Some of the gate level features form gate electrodes of transistor devices. Others of the gate level features can form conductive segments extending between two points within the gate level. Also, others of the gate level features may be non-functional with respect to integrated circuit operation. It should be understood that the each of the gate level features, regardless of function, is defined to extend across the gate level within their respective gate level feature layout channels without physically contacting other gate level features defined with adjacent gate level feature layout channels.

In one embodiment, the gate level features are defined to provide a finite number of controlled layout shape-to-shape lithographic interactions which can be accurately predicted and optimized for in manufacturing and design processes. In this embodiment, the gate level features are defined to avoid layout shape-to-shape spatial relationships which would introduce adverse lithographic interaction within the layout that cannot be accurately predicted and mitigated with high probability. However, it should be understood that changes in direction of gate level features within their gate level layout channels are acceptable when corresponding lithographic interactions are predictable and manageable.

It should be understood that each of the gate level features, regardless of function, is defined such that no gate level feature along a given gate electrode track is configured to connect directly within the gate level to another gate level feature defined along a different gate electrode track without utilizing a non-gate level feature. Moreover, each connection between gate level features that are placed within different gate level layout channels associated with different gate electrode tracks is made through one or more non-gate level features, which may be defined in higher interconnect levels, i.e., through one or more interconnect levels above the gate level, or by way of local interconnect features at or below the gate level.

EXEMPLARY EMBODIMENTS

In one embodiment, a cell circuit of a semiconductor device is disclosed. The cell circuit includes a substrate and a number of linear-shaped diffusion fins defined to extend over the substrate in a first direction, so as to extend parallel to each other. Each of the number of linear-shaped diffusion fins is defined to project upward from the substrate along their extent in the first direction. In one embodiment, each of the number of linear-shaped diffusion fins is formed from a doped silicon-based material to form either a p-type or an n-type transistor diffusion region.

The cell circuit also includes a number of gate level structures defined to extend in a conformal manner over some of the number of linear-shaped diffusion fins. Portions of each gate level structure that extend over any of the number of linear-shaped diffusion fins extend in a second direction that is substantially perpendicular to the first direction. Portions of each gate level structure that extend over any of the number of linear-shaped diffusion fins form gate electrodes of a corresponding transistor. In one embodiment, each of the number of gate level structures is formed from an electrically conductive material.

In one embodiment, the number of linear-shaped diffusion fins are positioned on diffusion tracks that correspond to virtual lines of a diffusion fin virtual grate. The diffusion tracks extend in the first direction over the substrate. In a particular embodiment, the diffusion tracks are positioned based on a fixed diffusion track pitch. The fixed diffusion track pitch corresponds to an equal perpendicular spacing between adjacent diffusion tracks. In one instance of this particular embodiment, a size of the fixed diffusion track pitch is set at a single exposure lithographic limit.

Also, in one embodiment, the first direction corresponds to a width direction of the cell circuit. In this embodiment, the fixed diffusion track pitch is related to a height of the cell circuit, such that a continuity of the fixed diffusion track pitch is maintained across boundaries of the cell circuit to form a global set of equally spaced diffusion tracks across a group of neighboring cell circuits. In one instance of this embodiment, the height of the cell circuit is an integer multiple of the fixed diffusion track pitch.

The number of linear-shaped diffusion fins are positioned on diffusion tracks as needed for cell circuit functionality. In various embodiments, some diffusion tracks are partially filled with linear-shaped diffusion fins, some diffusion tracks are completely filled with linear-shaped diffusion fins, some diffusion tracks are vacant and do not have a linear-shaped diffusion fin positioned thereon, or any combination thereof.

In one embodiment, the portions of the gate level structures that extend over any of the number of linear-shaped diffusion fins are positioned on gate electrode tracks that correspond to virtual lines of a gate level virtual grate. The gate electrode tracks extend in the second direction over the substrate. In one embodiment, the gate electrode tracks are positioned based on a fixed gate electrode track pitch. The fixed gate electrode track pitch corresponds to an equal perpendicular spacing between adjacent gate electrode tracks.

In one embodiment, the second direction corresponds to a height direction of the cell circuit. The fixed gate electrode track pitch can be related to a width of the cell circuit, such that a continuity of the fixed gate electrode track pitch is maintained across boundaries of the cell circuit to form a global set of equally spaced gate electrode tracks across a group of neighboring cell circuits. In one embodiment, the width of the cell circuit is an integer multiple of the fixed gate electrode track pitch.

The gate level structures are positioned on gate electrode tracks as needed for cell circuit functionality. In various embodiments, some gate electrode tracks are partially filled with gate level structures, some gate electrode tracks are completely filled with gate level structures, some gate electrode tracks are vacant and do not have a gate level structure positioned thereon, or any combination thereof.

Also, in another embodiment, the gate level structures are positioned to maximally fill gate electrode tracks. In this embodiment, breaks are defined between multiple gate level structures along individual gate electrode tracks as needed for cell circuit functionality. In one instance of this embodiment, the breaks defined between multiple gate level structures along individual gate electrode tracks are uniform in size through the cell circuit.

The cell circuit can also include a number of local interconnect structures defined between neighboring gate level structures so as to extend in the second direction parallel to the neighboring gate level structures. The number of local interconnect structures are formed of an electrically conductive material. Also, the number of local interconnect structures are formed at or below a gate level of the cell circuit. Additionally, the cell circuit can include a number of higher level interconnect structures defined in an interconnect level above a gate level of the cell circuit. In one embodiment, the number of higher level interconnect structures are linear-shaped and extend in the first direction. In another embodiment, the number of higher level interconnect structures are unrestricted with regard to shape and are formed as necessary for circuit functionality. The cell circuit can also include a number of contact structures, and any other type of structure previously discussed with regard to the examples of FIGS. 2A-2C.

In another embodiment, a semiconductor device cell layout is disclosed. This embodiment is essentially a layout of the cell circuit embodiment discussed above. Therefore, any features discussed above with regard to the cell circuit embodiment can be represented within this cell layout embodiment. The cell layout includes a diffusion level layout and a gate level layout. The diffusion level layout includes a number of diffusion fin layout shapes defined to extend in only a first direction across the cell layout, so as to extend parallel to each other. The number of diffusion fin layout shapes correspond to diffusion fin structures defined to project upward from a substrate along their extent in the first direction.

In one embodiment, the diffusion fin layout shapes are positioned on diffusion tracks that correspond to virtual lines of a diffusion fin virtual grate. The diffusion tracks extend in the first direction across the cell layout. In one embodiment, the diffusion tracks are positioned based on a fixed diffusion track pitch. The fixed diffusion track pitch corresponds to an equal perpendicular spacing between adjacent diffusion tracks. In one embodiment, the first direction corresponds to a width direction of the cell layout. In this embodiment, the fixed diffusion track pitch is related to a height of the cell layout, such that a continuity of the fixed diffusion track pitch is maintained across boundaries of the cell layout to form a global set of equally spaced diffusion tracks across a group of neighboring cell layouts. In one instance of this embodiment, the height of the cell layout is an integer multiple of the fixed diffusion track pitch.

The gate level layout of the cell layout includes a number of gate level layout shapes defined to extend in a second direction across the cell layout that is substantially perpendicular to the first direction. The gate level layout shapes correspond to gate level structures defined to extend in a conformal manner over some of the diffusion fin structures which correspond to the diffusion fin layout shapes. Portions of each gate level structure that extend over any of the diffusion fin structures form gate electrodes of a corresponding transistor.

In one embodiment, portions of the gate level layout shapes that extend over any of the diffusion fin layout shapes are positioned on gate electrode tracks that correspond to virtual lines of a gate level virtual grate. The gate electrode tracks extend in the second direction across the cell layout, i.e., perpendicular to the first direction. In one embodiment, the gate electrode tracks are positioned based on a fixed gate electrode track pitch. The fixed gate electrode track pitch corresponds to an equal perpendicular spacing between adjacent gate electrode tracks. In one embodiment, the second direction corresponds to a height direction of the cell layout. In this embodiment, the fixed gate electrode track pitch is related to a width of the cell layout, such that a continuity of the fixed gate electrode track pitch is maintained across boundaries of the cell layout to form a global set of equally spaced gate electrode tracks across a group of neighboring cell layouts. In one instance of this embodiment, the width of the cell layout is an integer multiple of the fixed gate electrode track pitch. It should be understood that the cell layout can also include a number of additional layout shapes and levels corresponding to other circuit structures, including any other type of circuit structure previously discussed with regard to the examples of FIGS. 2A-2C.

It should be understood that any cell layout incorporating finfet transistors as disclosed herein can be stored in a tangible finial, such as in a digital format on a computer readable medium. For example, a given cell layout can be stored in a layout data file, and can be selectable from one or more libraries of cells. The layout data file can be formatted as a GDS II (Graphic Data System) database file, an OASIS (Open Artwork System Interchange Standard) database file, or any other type of data file format suitable for storing and communicating semiconductor device layouts. Also, multi-level layouts of a cell incorporating finfet transistors as disclosed herein can be included within a multi-level layout of a larger semiconductor device. The multi-level layout of the larger semiconductor device can also be stored in the form of a layout data file, such as those identified above.

Also, the invention described herein can be embodied as computer readable code on a computer readable medium. For example, the computer readable code can include a layout data file within which a layout of a cell incorporating finfet transistors as disclosed herein is stored. The computer readable code can also include program instructions for selecting one or more layout libraries and/or cells that include finfet transistors as disclosed herein. The layout libraries and/or cells can also be stored in a digital format on a computer readable medium.

The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. Multiple computer readable media distributed within a network of coupled computer systems can also be used to store respective portions of the computer readable code such that the computer readable code is stored and executed in a distributed fashion within the network.

It should be further understood that any cell layout incorporating finfet transistors as disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions and/or diffusion fins are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:
1. A cell circuit of a semiconductor device, comprising:
a substrate;
a number of linear-shaped diffusion fins defined to extend over the substrate in a first direction so as to extend parallel to each other, each of the number of linear-shaped diffusion fins defined to project upward from the substrate along their extent in the first direction, wherein the number of linear-shaped diffusion fins are positioned on one or more of a plurality of diffusion tracks that are virtual lines of a diffusion fin virtual grate, wherein the plurality of diffusion tracks extend in the first direction over the substrate, wherein the plurality of diffusion tracks are positioned based on a fixed diffusion track pitch, wherein the fixed diffusion track pitch corresponds to an equal spacing between adjacent side-by-side positioned ones of the plurality of diffusion tracks as measured in a second direction perpendicular to the first direction and parallel to the substrate; and
a number of gate level structures defined to extend in a conformal manner over one or more of the number of linear-shaped diffusion fins, such that portions of each gate level structure that extend over any of the number of linear-shaped diffusion fins extend in the second direction perpendicular to the first direction, wherein portions of each gate level structure that extend over any of the number of linear-shaped diffusion fins form gate electrodes of a corresponding transistor.

2. The cell circuit of a semiconductor device as recited in claim 1, wherein the first direction corresponds to a width direction of the cell circuit, and wherein the fixed diffusion track pitch is related to a height of the cell circuit, such that a continuity of the fixed diffusion track pitch is maintained across boundaries of the cell circuit to form a global set of equally spaced diffusion tracks across a group of neighboring cell circuits.

3. The cell circuit of a semiconductor device as recited in claim 2, wherein the height of the cell circuit is an integer multiple of the fixed diffusion track pitch.

4. The cell circuit of a semiconductor device as recited in claim 1, wherein at least one of the plurality of diffusion tracks is partially filled with linear-shaped diffusion fins.

5. The cell circuit of a semiconductor device as recited in claim 1, wherein at least one of the plurality of diffusion tracks is completely filled with linear-shaped diffusion fins.

6. The cell circuit of a semiconductor device as recited in claim 1, wherein at least one of the plurality of diffusion tracks is vacant and does not have a linear-shaped diffusion fin positioned thereon.

7. A cell circuit of a semiconductor device, comprising:
a substrate;
a number of linear-shaped diffusion fins defined to extend over the substrate in a first direction so as to extend parallel to each other, each of the number of linear-shaped diffusion fins defined to project upward from the substrate along their extent in the first direction; and
a number of gate level structures defined to extend in a conformal manner over one or more of the number of linear-shaped diffusion fins, such that portions of each gate level structure that extend over any of the number of linear-shaped diffusion fins extend in a second direction perpendicular to the first direction, wherein the portions of each gate level structure that extend over any of the number of linear-shaped diffusion fins form gate electrodes of a corresponding transistor, wherein the portions of each gate level structure that extend over any of the number of linear-shaped diffusion fins are positioned on one or more of a plurality of gate electrode tracks that are virtual lines of a gate level virtual grate, wherein the plurality of gate electrode tracks extend in the second direction over the substrate, wherein the plurality of gate electrode tracks are positioned based on a fixed gate electrode track pitch, wherein the fixed gate electrode track pitch corresponds to an equal perpendicular spacing between adjacent side-by-side positioned ones of the plurality of gate electrode tracks.

8. The cell circuit of a semiconductor device as recited in claim 7, wherein the second direction corresponds to a height direction of the cell circuit, and wherein the fixed gate electrode track pitch is related to a width of the cell circuit, such that a continuity of the fixed gate electrode track pitch is maintained across boundaries of the cell circuit to form a global set of equally spaced gate electrode tracks across a group of neighboring cell circuits.

9. The cell circuit of a semiconductor device as recited in claim 8, wherein the width of the cell circuit is an integer multiple of the fixed gate electrode track pitch.

10. The cell circuit of a semiconductor device as recited in claim 7, wherein at least one of the plurality of gate electrode tracks is partially filled with gate level structures.

11. The cell circuit of a semiconductor device as recited in claim 7, wherein at least one of the plurality of gate electrode tracks is completely filled with gate level structures.

12. The cell circuit of a semiconductor device as recited in claim 7, wherein at least one of the plurality of gate electrode tracks is vacant and does not have a gate level structure positioned thereon.

13. The cell circuit of a semiconductor device as recited in claim 7, wherein the number of gate level structures are positioned to maximally fill each of the plurality of gate electrode tracks that has at least one of the number of gate level structures positioned thereon, wherein breaks are defined between multiple gate level structures along individual gate electrode tracks as needed for cell circuit functionality.

14. The cell circuit of a semiconductor device as recited in claim 13, wherein the breaks defined between multiple gate level structures along individual gate electrode tracks are uniform in size through the cell circuit.

15. A cell circuit of a semiconductor device, comprising:
a substrate;
a number of linear-shaped diffusion fins defined to extend over the substrate in a first direction so as to extend parallel to each other, each of the number of linear-shaped diffusion fins defined to project upward from the substrate along their extent in the first direction;
a number of gate level structures defined to extend in a conformal manner over one or more of the number of linear-shaped diffusion fins, such that portions of each gate level structure that extend over any of the number of linear-shaped diffusion fins extend in a second direction perpendicular to the first direction, wherein the portions of each gate level structure that extend over any of the number of linear-shaped diffusion fins form gate electrodes of a corresponding transistor; and
a number of local interconnect structures defined between neighboring gate level structures so as to extend in the second direction parallel to the neighboring gate level structures, wherein the number of local interconnect structures are formed of an electrically conductive material, and wherein the number of local interconnect structures are formed at or below a gate level of the cell circuit.

16. A cell circuit of a semiconductor device, comprising:
a substrate;
a number of linear-shaped diffusion fins defined to extend over the substrate in a first direction so as to extend parallel to each other, each of the number of linear-shaped diffusion fins defined to project upward from the substrate along their extent in the first direction;
a number of gate level structures defined to extend in a conformal manner over one or more of the number of linear-shaped diffusion fins, such that portions of each gate level structure that extend over any of the number of linear-shaped diffusion fins extend in a second direction perpendicular to the first direction, wherein the portions of each gate level structure that extend over any of the number of linear-shaped diffusion fins form gate electrodes of a corresponding transistor; and
a number of higher level interconnect structures defined in an interconnect level above a gate level of the cell circuit, wherein the number of higher level interconnect structures are linear-shaped and extend in the first direction.

17. A semiconductor device cell layout, comprising:
a diffusion level layout including a number of diffusion fin layout shapes defined to extend in only a first direction across the cell layout so as to extend parallel to each other, each of the number of diffusion fin layout shapes corresponding to diffusion fin structures defined to project upward from a substrate along their extent in the first direction, wherein the number of diffusion fin layout shapes are positioned on a plurality of diffusion tracks that are virtual lines of a diffusion fin virtual grate, wherein the plurality of diffusion tracks extend in the first direction over the substrate, wherein the plurality of diffusion tracks are positioned based on a fixed diffusion track pitch, wherein the fixed diffusion track pitch corresponds to an equal spacing between adjacent side-by-side positioned ones of the plurality of diffusion tracks as measured in a second direction perpendicular to the first direction and parallel to the substrate; and
a gate level layout including a number of gate level layout shapes defined to extend in the second direction across the cell layout perpendicular to the first direction, the gate level layout shapes corresponding to gate level structures defined to extend in a conformal manner over one or more of the diffusion fin structures corresponding to the diffusion fin layout shapes, such that portions of each gate level structure that extend over any of the diffusion fin structures form gate electrodes of a corresponding transistor.

18. The semiconductor device cell layout as recited in claim 17, wherein the gate level layout shapes that extend over any of the diffusion fin structures are positioned on gate electrode tracks that are virtual lines of a gate level virtual grate, wherein the gate electrode tracks extend in the second direction over the substrate.

19. The semiconductor device cell layout as recited in claim 17, further comprising:
a number of local interconnect structure layout shapes defined between neighboring gate level layout shapes so as to extend in the second direction parallel to the neighboring gate level layout shapes, wherein the number of local interconnect structure layout shapes are formed of an electrically conductive material.

20. The semiconductor device cell layout as recited in claim 17, further comprising:
a higher level interconnect layout including a number of higher level interconnect structure layout shapes, wherein the number of higher level interconnect structure layout shapes are linear-shaped and extend in the first direction.

\* \* \* \* \*